US011014229B2

(12) United States Patent
Owa

(10) Patent No.: US 11,014,229 B2
(45) Date of Patent: May 25, 2021

(54) ROBOT AND ROBOT SYSTEM

(71) Applicant: Seiko Epson Corporation, Tokyo (JP)

(72) Inventor: Takuya Owa, Shen Zhen (CN)

(73) Assignee: Seiko Epson Corporation

( * ) Notice: Subject to any disclaimer, the term of this patent is extended or adjusted under 35 U.S.C. 154(b) by 120 days.

(21) Appl. No.: 16/177,564

(22) Filed: Nov. 1, 2018

(65) Prior Publication Data

US 2019/0126466 A1 May 2, 2019

(30) Foreign Application Priority Data

Nov. 2, 2017 (JP) .............................. JP2017-212510

(51) Int. Cl.
B25J 9/04 (2006.01)
B25J 9/12 (2006.01)
B25J 9/10 (2006.01)

(52) U.S. Cl.
CPC ............... B25J 9/126 (2013.01); B25J 9/04 (2013.01); B25J 9/102 (2013.01); B25J 9/1025 (2013.01)

(58) Field of Classification Search
CPC ..... B25J 9/04; B25J 9/102; B25J 9/126; B25J 9/1025; B25J 17/025; B25J 17/0241; B25J 19/0025; B25J 19/0029; B25J 19/0041; Y10S 901/25; Y10S 901/26; F16H 37/027; F16H 7/02; F16H 2007/0863; F16H 7/20; F16H 37/02
USPC ........................................ 74/490.01, 490.05
See application file for complete search history.

(56) References Cited

U.S. PATENT DOCUMENTS

| 3,826,383 | A | * | 7/1974 | Richter | .................... B25J 9/046 414/730 |
| 4,030,617 | A | * | 6/1977 | Richter | .................. B25J 9/1025 414/4 |
| 4,840,090 | A | * | 6/1989 | Iwata | ................... B25J 19/0029 74/640 |
| 5,132,887 | A | * | 7/1992 | Torii | .................. B23K 26/0884 219/121.78 |
| 5,178,031 | A | * | 1/1993 | Orsi | ....................... B25J 9/1025 318/568.11 |
| 6,408,224 | B1 | * | 6/2002 | Okamoto | ............... B25J 9/1661 29/721 |
| 6,976,401 | B2 | * | 12/2005 | Okamoto | ............. B25J 17/0291 74/490.02 |

(Continued)

FOREIGN PATENT DOCUMENTS

JP 2013-248679 A 12/2013
JP 2014-136295 A 7/2014

*Primary Examiner* — Victor L MacArthur
*Assistant Examiner* — Gregory Robert Weber
(74) *Attorney, Agent, or Firm* — Harness, Dickey & Pierce, P.L.C.

(57) ABSTRACT

A robot includes a robot arm including an A arm rotating around an A rotation axis and a B arm provided rotatably around a B rotation axis having an axial direction different from an axial direction of the A rotation axis, an A driving mechanism including an A motor and an A reduction gear and configured to drive the A arm, and a B driving mechanism including a B motor and a B reduction gear and configured to drive the B arm. A center axis of an input shaft and a center axis of an output shaft of the A reduction gear correspond to each other. A center axis of an input shaft and a center axis of an output shaft of the B reduction gear correspond to each other.

18 Claims, 22 Drawing Sheets

(56) References Cited

U.S. PATENT DOCUMENTS

| | | | | |
|---|---|---|---|---|
| 7,501,603 B2* | 3/2009 | Kalanovic | ............... | A44C 27/00 |
| | | | | 219/121.6 |
| 8,413,538 B2* | 4/2013 | Haniya | ................ | B25J 19/0029 |
| | | | | 74/490.03 |
| 10,335,944 B2* | 7/2019 | Inoue | ........................ | B25J 9/126 |
| 2012/0266712 A1* | 10/2012 | Oka | ..................... | B25J 17/0283 |
| | | | | 74/490.05 |
| 2013/0319160 A1 | 12/2013 | Oikawa | | |
| 2014/0196562 A1 | 7/2014 | Takahashi et al. | | |
| 2017/0368697 A1* | 12/2017 | Inoue | .................. | B25J 19/0029 |

* cited by examiner

ROBOT AND ROBOT SYSTEM

BACKGROUND

1. Technical Field

The present invention relates to a robot and a robot system.

2. Related Art

There is known a robot including a base and a robot arm including a plurality of arms (links). One arm of adjacent two arms of the robot arm is rotatably coupled to the other arm via a joint section. An arm on the most distal end side (the most upstream side) is rotatably coupled to the base via a joint section. The joint sections are driven by motors. The arms turn according to the driving of the joint sections. For example, a hand is detachably attached to an arm on the most distal end side (the most downstream side) as an end effector. For example, the robot grasps an object with the hand, moves the object to a predetermined place, and performs predetermined work such as assembly.

In such a robot, for example, a joint section of a wrist section is desirably small in size and light in weight in order to avoid interference with a peripheral device.

JP-A-2014-136295 (Patent Literature 1) discloses a vertical articulated robot. In this robot, to turn two wrist sections around two rotation axes orthogonal to each other, a joint section of one wrist section includes a first rotating body and a joint section of the other wrist section includes a second rotating body. The first rotating body and the second rotating body are disposed to be shifted such that rotating shafts of the first and second rotating bodies are parallel to each other and the first rotating body and the second rotating body do not interfere with each other.

In the robot described in Patent Literature 1, the first rotating body and the second rotating body are separated not to interfere with each other. This is disadvantageous for a reduction in size and is disadvantageous for a reduction in weight.

SUMMARY

An advantage of some aspects of the invention is to solve at least a part of the problems described above, and the invention can be implemented as the following aspects or application examples.

A robot according to an aspect of the invention includes: a robot arm including an A arm rotating around an A rotation axis and a B arm provided in the A arm rotatably around a B rotation axis having an axial direction different from an axial direction of the A rotation axis; an A driving mechanism including an A motor and an A reduction gear and configured to drive the A arm; and a B driving mechanism including a B motor and a B reduction gear and configured to drive the B arm. A center axis of an input shaft and a center axis of an output shaft of the A reduction gear correspond to each other. A center axis of an input shaft and a center axis of an output shaft of the B reduction gear correspond to each other. An axial direction of the input shaft of the A reduction gear and an axial direction of the input shaft of the B reduction gear are different from each other. The A reduction gear includes a first through-hole extending in the axial direction of the input shaft of the A reduction gear. The B driving mechanism includes a transmitting mechanism configured to transmit a driving force of the B motor to the input shaft of the B reduction gear. A part of the transmitting mechanism is inserted through the first through-hole.

With such a robot according to the aspect of the invention, a reduction in the size and a reduction in the weight of the robot can be achieved.

In the robot according to the aspect of the invention, it is preferable that the B reduction gear includes a second through-hole extending in the axial direction of the input shaft of the B reduction gear.

With this configuration, for example, a wire can be inserted through the second through-hole. A reduction in the weight of the B reduction gear can be achieved.

In the robot according to the aspect of the invention, it is preferable that the A reduction gear and the B reduction gear are respectively wave reduction gears.

With this configuration, a reduction in the size and a reduction in the weight of the robot can be achieved.

In the robot according to the aspect of the invention, it is preferable that the wave reduction gear includes: an internal gear; a flexible external gear configured to partially mesh with the internal gear; and a wave generator configured to come into contact with an inner circumferential surface of the external gear and move a meshing position of the internal gear and the external gear in the circumferential direction.

With this configuration, a reduction in the size and a reduction in the weight of the robot can be achieved.

In the robot according to the aspect of the invention, it is preferable that the wave generator of the A reduction gear includes a bearing and a screw hole, and the bearing of the A reduction gear and the screw hole of the A reduction gear overlap each other when viewed from the axial direction of the input shaft of the A reduction gear.

With this configuration, a reduction in the size and a reduction in the weight of the robot can be achieved.

In the robot according to the aspect of the invention, it is preferable that the wave generator of the B reduction gear includes a bearing and a screw hole, and the bearing of the B reduction gear and the screw hole of the B reduction gear overlap each other when viewed from the axial direction of the input shaft of the B reduction gear.

With this configuration, a reduction in the size and a reduction in the weight of the robot can be achieved.

In the robot according to the aspect of the invention, it is preferable that a position of the wave generator of the A reduction gear with respect to the internal gear of the A reduction gear and a position of the wave generator of the B reduction gear with respect to the internal gear of the B reduction gear are different from each other.

With this configuration, the same components can be used in the A reduction gear and the B reduction gear. Accordingly, the number of components can be reduced.

In the robot according to the aspect of the invention, it is preferable that the internal gear of the A reduction gear and the internal gear of the B reduction gear are respectively fixed to the A arm.

With this configuration, the A reduction gear and the B reduction gear can be appropriately attached.

In the robot according to the aspect of the invention, it is preferable that the transmitting mechanism includes a first bevel gear and a second bevel gear configured to mesh with each other, a rotation axis of the first bevel gear and the center axis of the input shaft of the A reduction gear correspond to each other, and a rotation axis of the second bevel gear and the center axis of the input shaft of the B reduction gear correspond to each other.

With this configuration, a reduction in the size and a reduction in the weight of the robot can be achieved.

In the robot according to the aspect of the invention, it is preferable that the first bevel gear includes a third through-hole extending in the axial direction of the input shaft of the A reduction gear.

With this configuration, for example, a wire can be inserted through the third through-hole. A reduction in the weight of the first bevel gear can be achieved.

In the robot according to the aspect of the invention, it is preferable that the second bevel gear includes a fourth through-hole extending in the axial direction of the input shaft of the B reduction gear.

With this configuration, for example, a wire can be inserted through the fourth through-hole. A reduction in the weight of the second bevel gear can be achieved.

In the robot according to the aspect of the invention, it is preferable that the B arm is an arm on a most distal end side of the robot arm.

With this configuration, a reduction in the size and a reduction in the weight of the distal end portion of the robot arm can be achieved.

In the robot according to the aspect of the invention, it is preferable that the robot arm includes a C arm rotating around a C rotation axis, and the A arm is rotatably cantilevered by the C arm.

With this configuration, a reduction in the size and a reduction in the weight of the robot can be achieved.

In the robot according to the aspect of the invention, it is preferable that the robot further includes a first cylinder body fixed to the C arm and disposed in the first through-hole.

With this configuration, for example, a wire can be inserted through the first cylinder body. When the A arm turns, the wire can be prevented from rubbing against the A arm.

In the robot according to the aspect of the invention, it is preferable that the robot further includes a first position restriction provided in the C arm and configured to restrict a position of a wire.

With this configuration, the wire can be prevented from interfering with a peripheral apparatus and the like.

In the robot according to the aspect of the invention, it is preferable that the robot further includes a second cylinder body fixed to the A arm and disposed in the second through-hole.

With this configuration, for example, a wire can be inserted through the second cylinder body. When the B arm turns, the wire can be prevented from rubbing against the B arm.

In the robot according to the aspect of the invention, it is preferable that the robot further includes a second position restriction provided in the A arm and configured to restrict a position of a wire.

With this configuration, the wire can be prevented from interfering with a peripheral device and the like.

A robot system according to an aspect of the invention includes: the robot according to the aspect explained above; and a control device configured to control driving of the robot.

With such a robot system according to the aspect of the invention, a reduction in the size and a reduction in the weight of the robot can be achieved.

BRIEF DESCRIPTION OF THE DRAWINGS

The invention will be described with reference to the accompanying drawings, wherein like numbers reference like elements.

DESCRIPTION OF EXEMPLARY EMBODIMENTS

A robot and a robot system according to embodiments of the invention are explained in detail below with reference to the accompanying drawings.

In the embodiments explained below, "A", "B", and "C" described in the appended claims are respectively explained as "fifth", "sixth", and "fourth" but are not limited to this. A may be a natural number equal to or smaller than four or may be a natural number equal to or larger than six. B only has to be a natural number larger than A by one. C only has to be a natural number smaller than A by one. Specifically, in the embodiments explained below, it is assumed that an A arm is a fifth arm, a B arm is a sixth arm, a C arm is a fourth arm, an A rotation axis is a fifth rotation axis, a B rotation axis is a sixth rotation axis, a C rotation axis is a fourth rotation axis, an A driving mechanism is a fifth driving mechanism, a B driving mechanism is a sixth driving mechanism, an A motor is a fifth motor, a B motor is a sixth motor, an A reduction gear is a fifth reduction gear, and a B reduction gear is a sixth reduction gear.

First Embodiment

Figure 1:
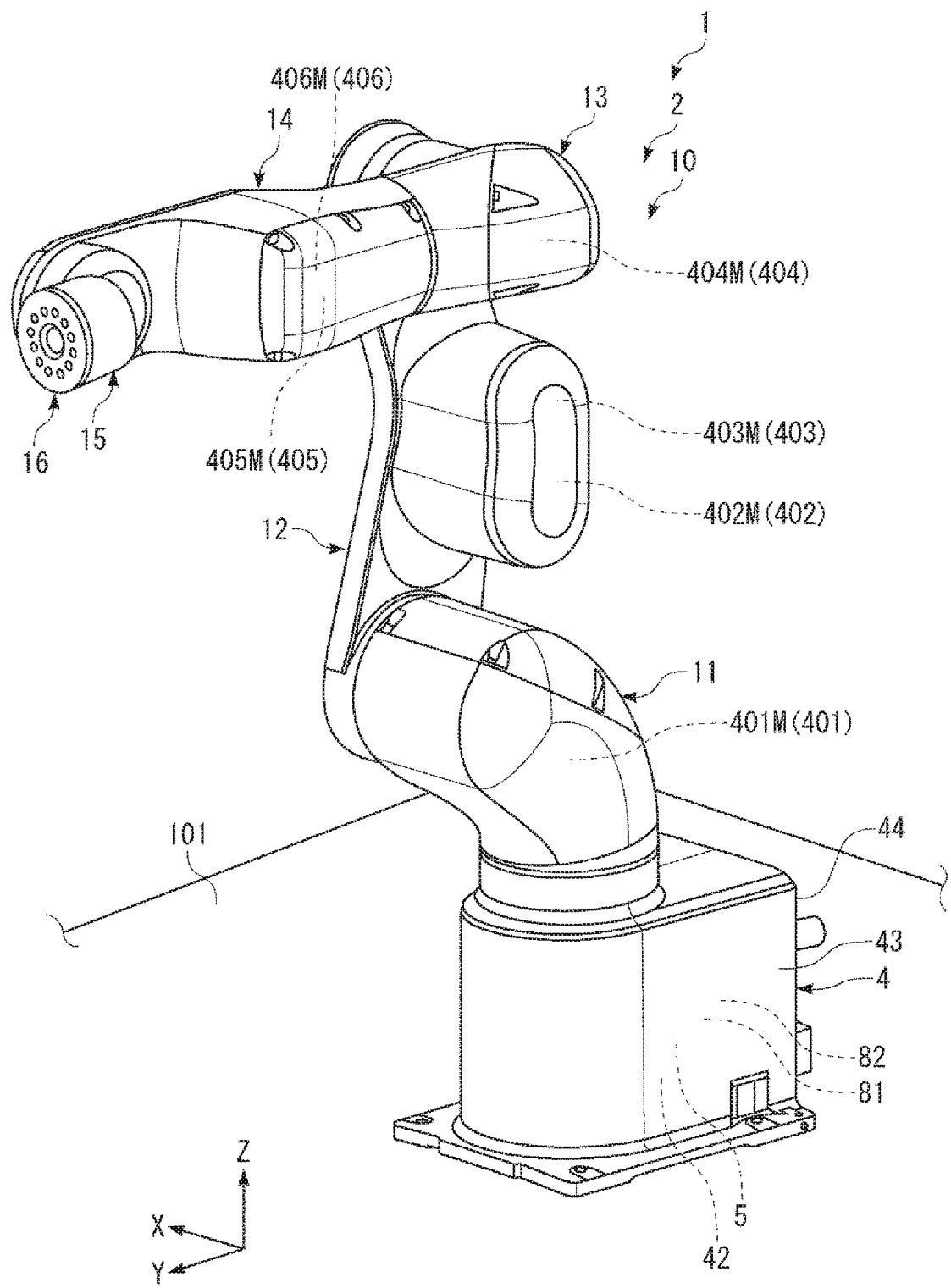
FIG. 1 is a perspective view showing a robot according to a first embodiment of the invention.
Figure 2:
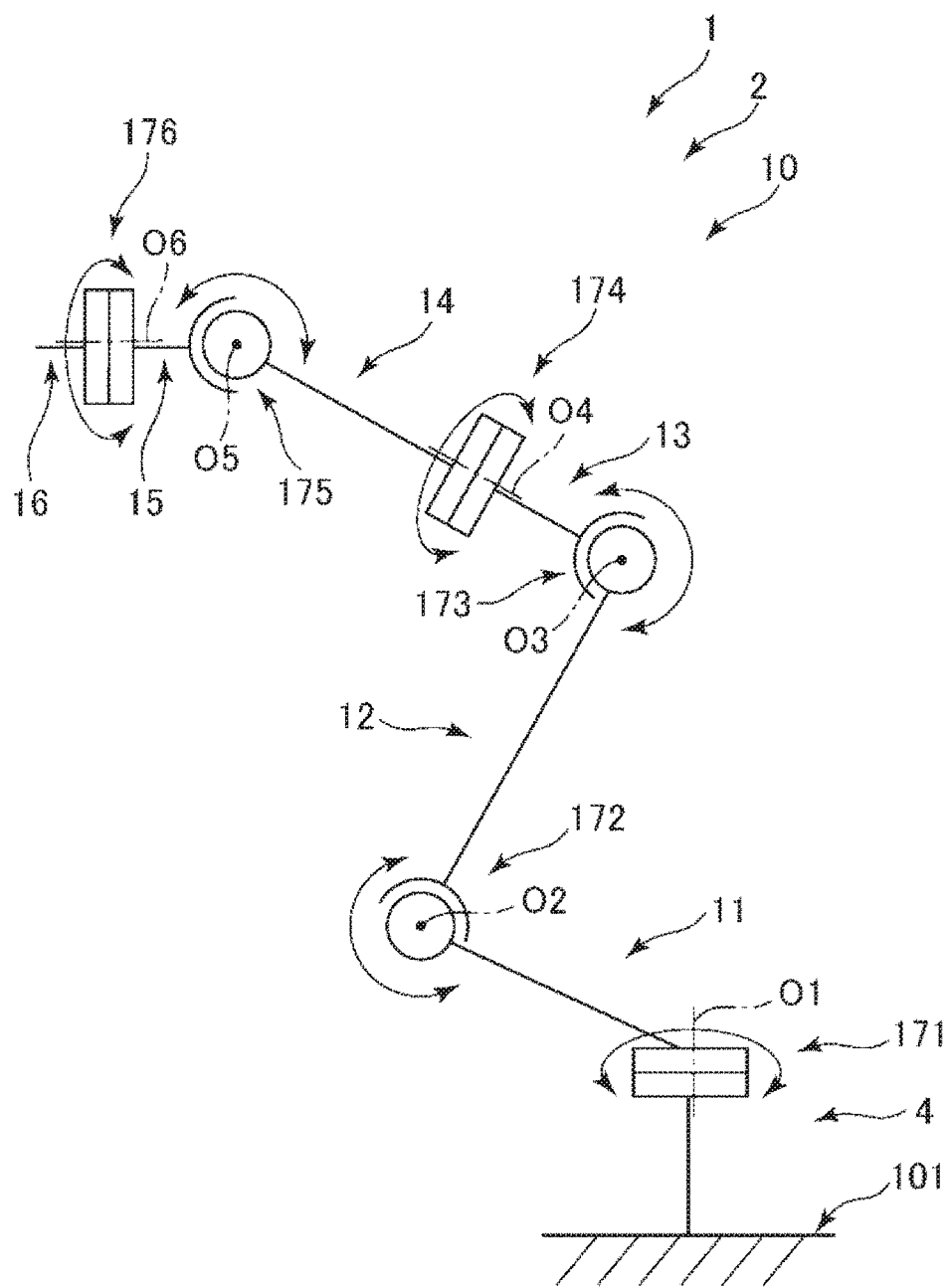
FIG. 2 is a schematic diagram of the robot shown in FIG. 1.
Figure 3:
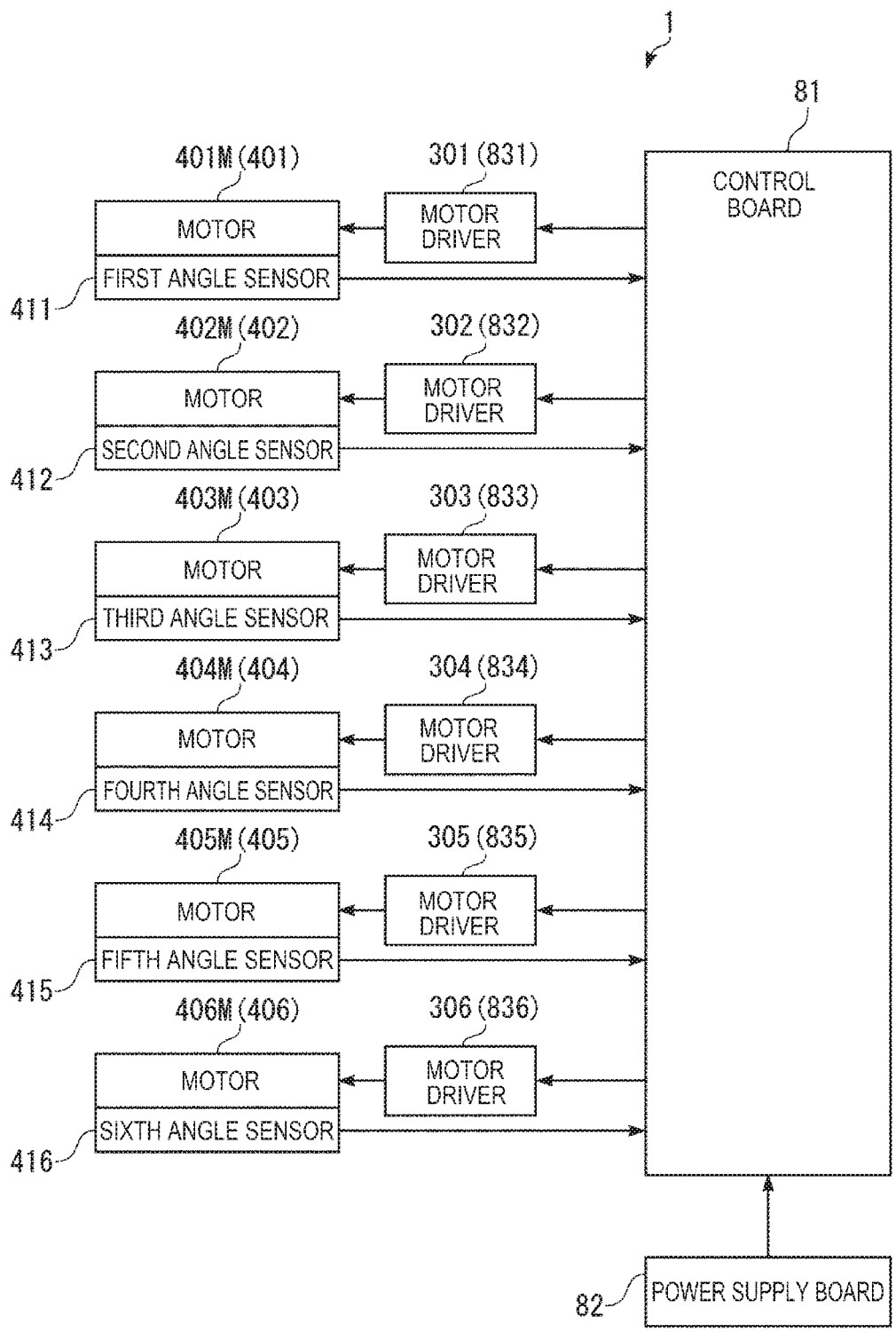
FIG. 3 is a block diagram showing a main part of the robot shown in FIG. 1.
Figure 4:
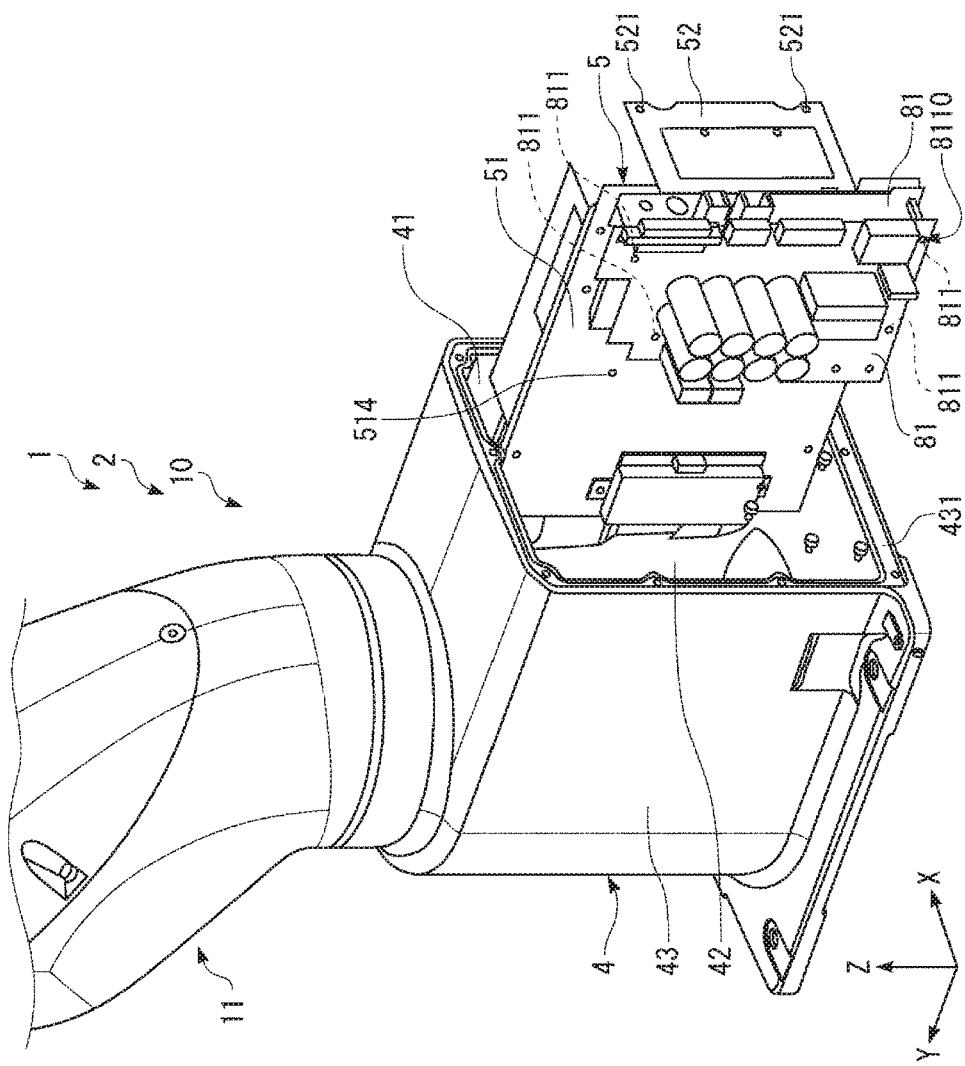
FIG. 4 is a perspective view showing a base and a first arm of the robot shown in FIG. 1.
Figure 5:
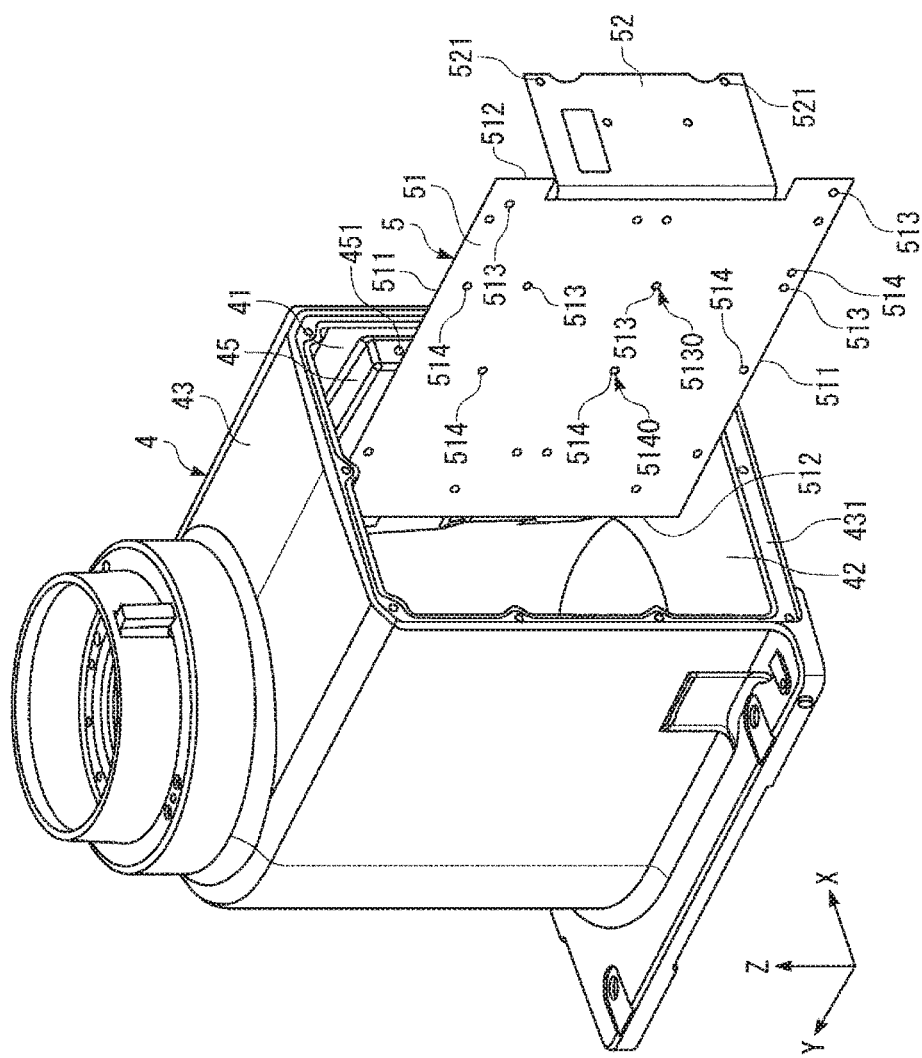
FIG. 5 is a perspective view showing the base of the robot shown in FIG. 1.
Figure 6:
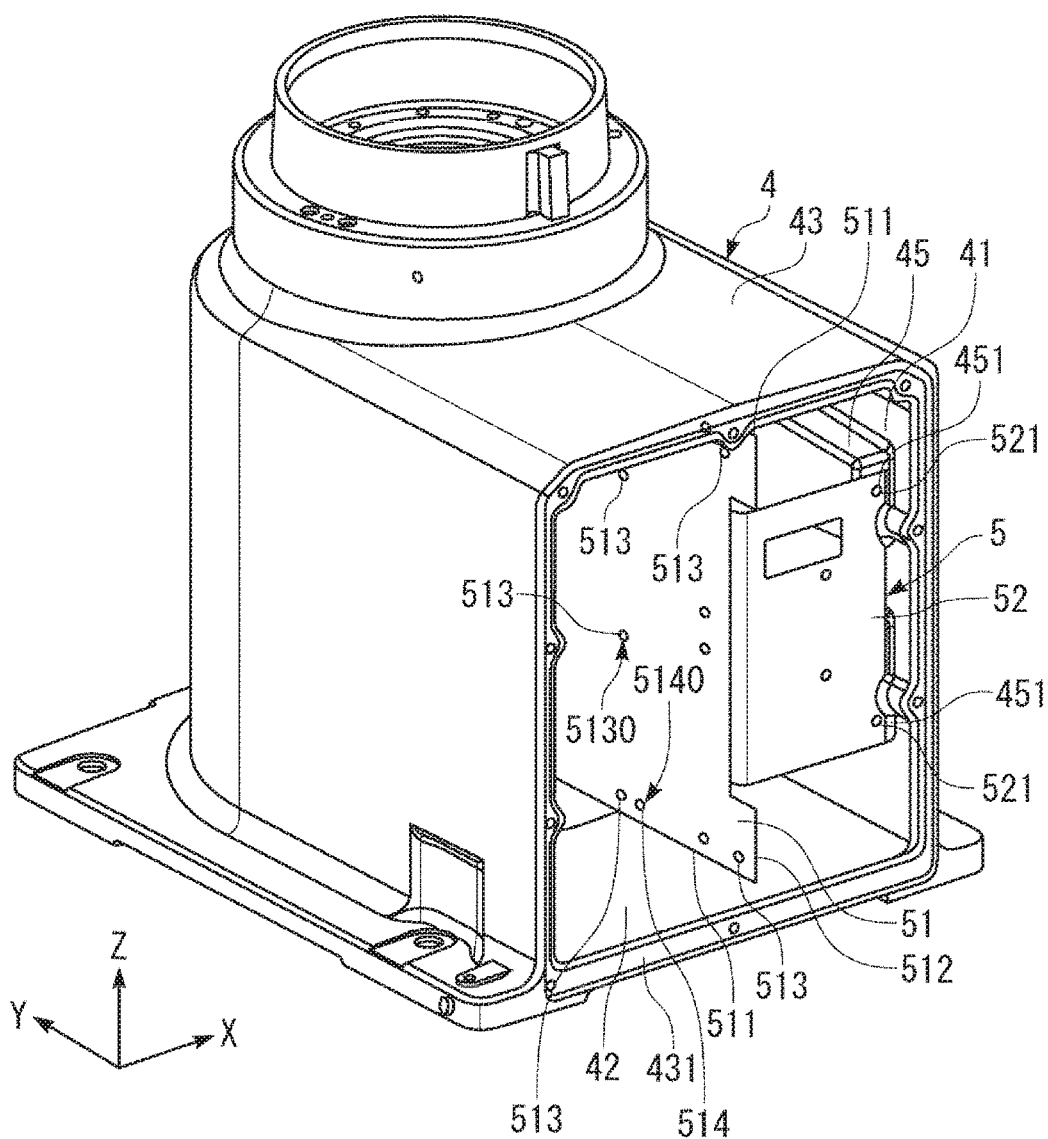
FIG. 6 is a perspective view showing the base of the robot shown in FIG. 1.
Figure 7:
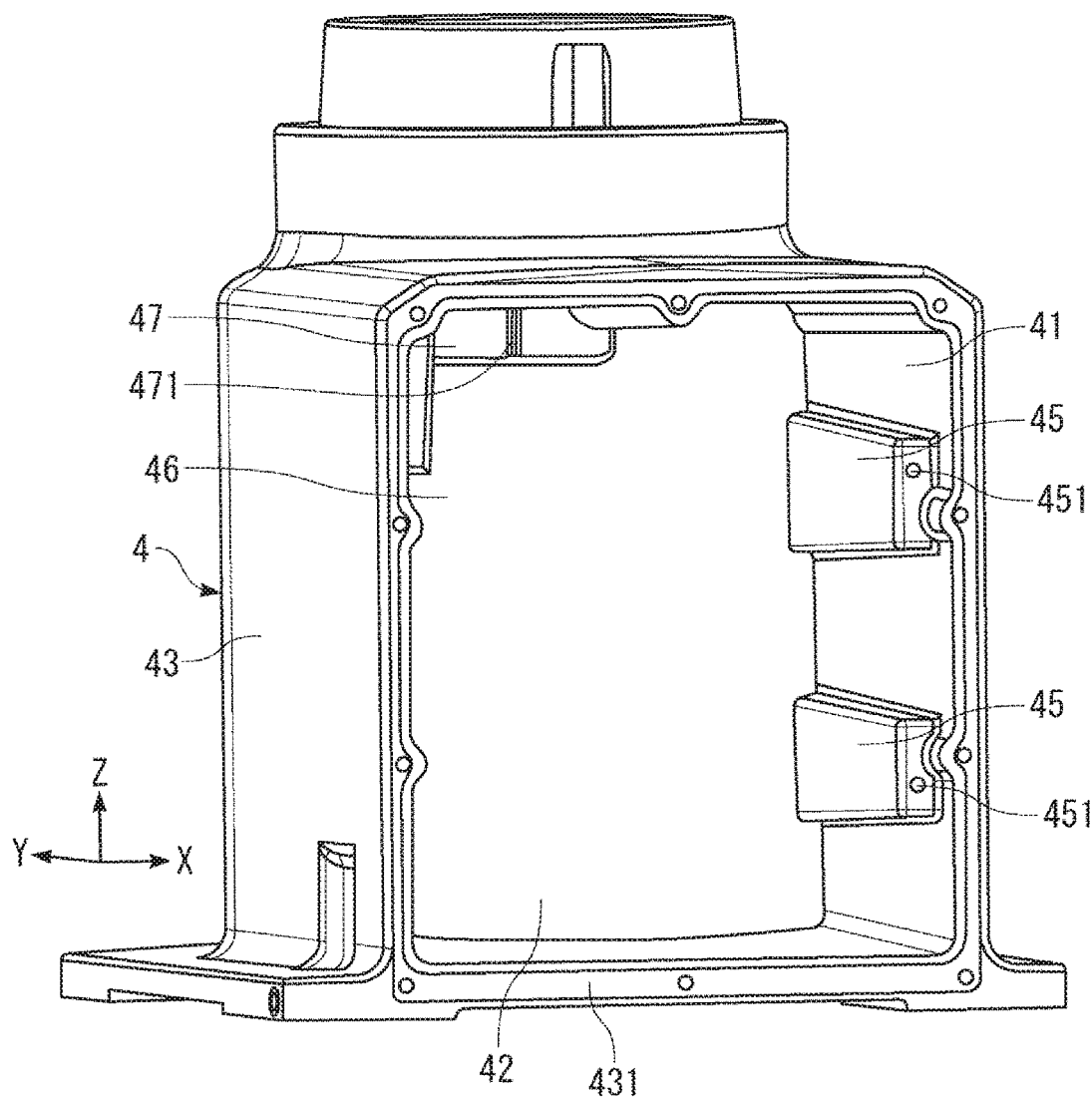
FIG. 7 is a perspective view showing the base of the robot shown in FIG. 1.
Figure 8:
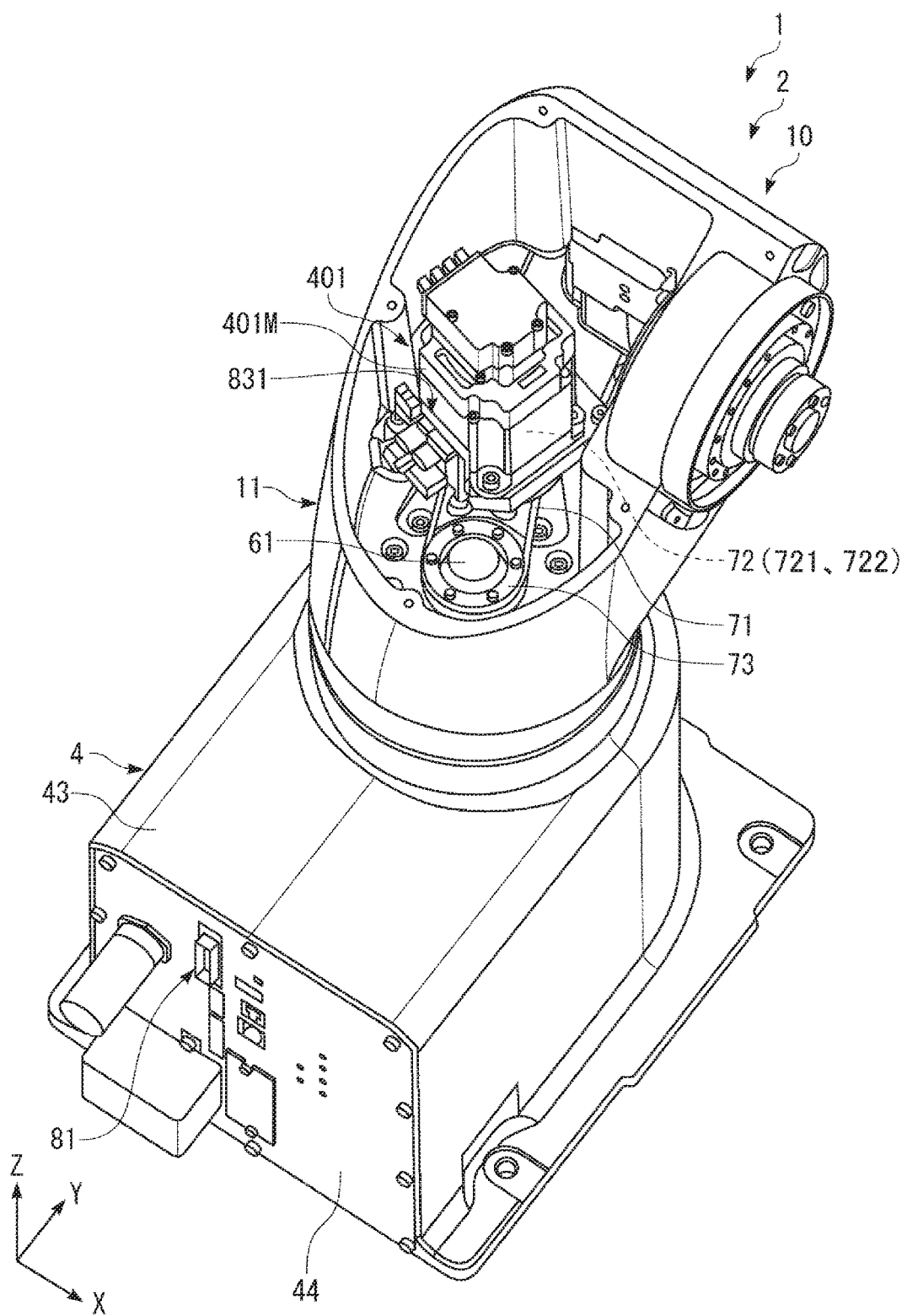
FIG. 8 is a perspective view showing the base and the first arm of the robot shown in FIG. 1.
Figure 9:
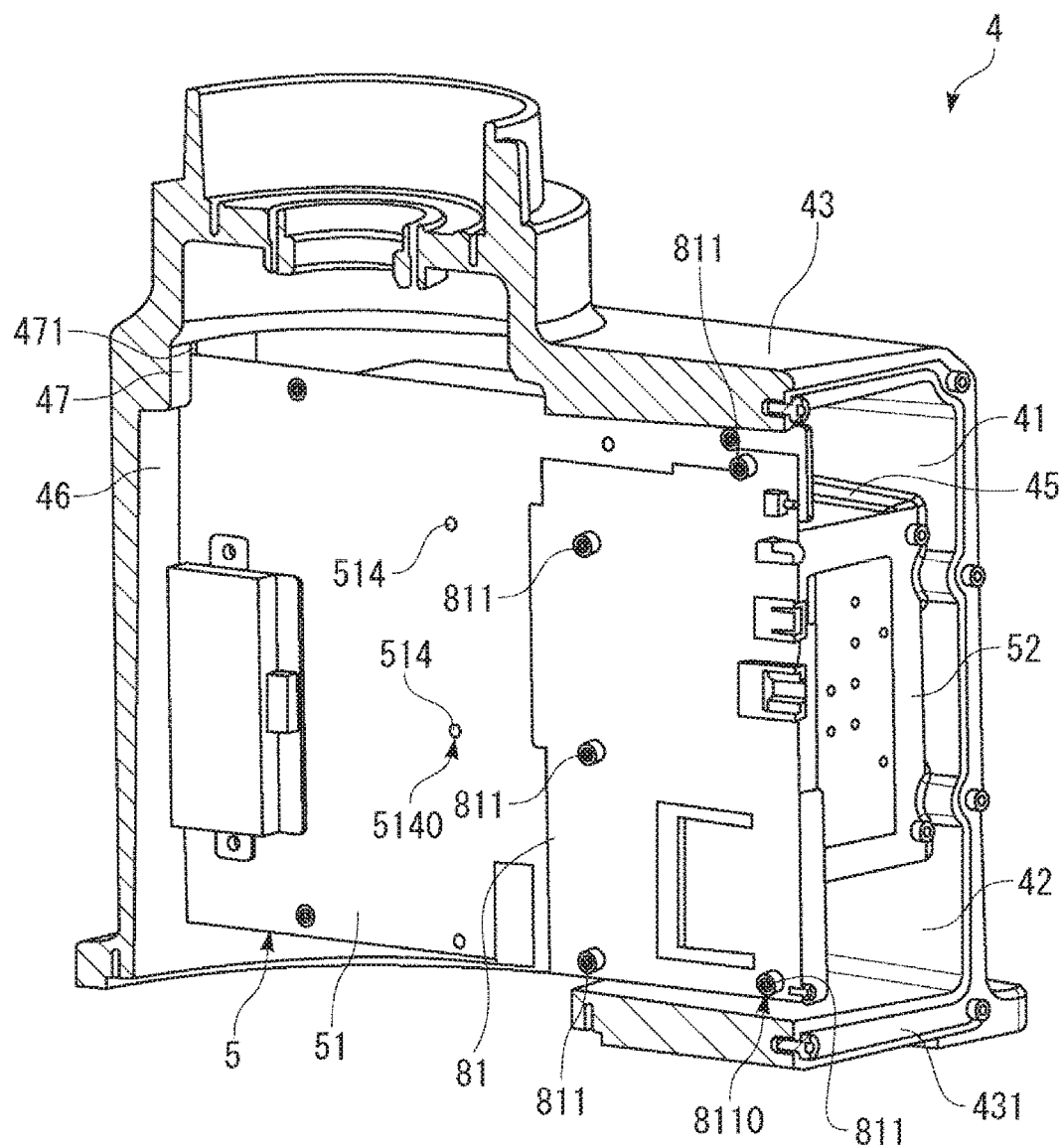
FIG. 9 is a sectional view showing the base of the robot shown in FIG. 1.
Figure 10:
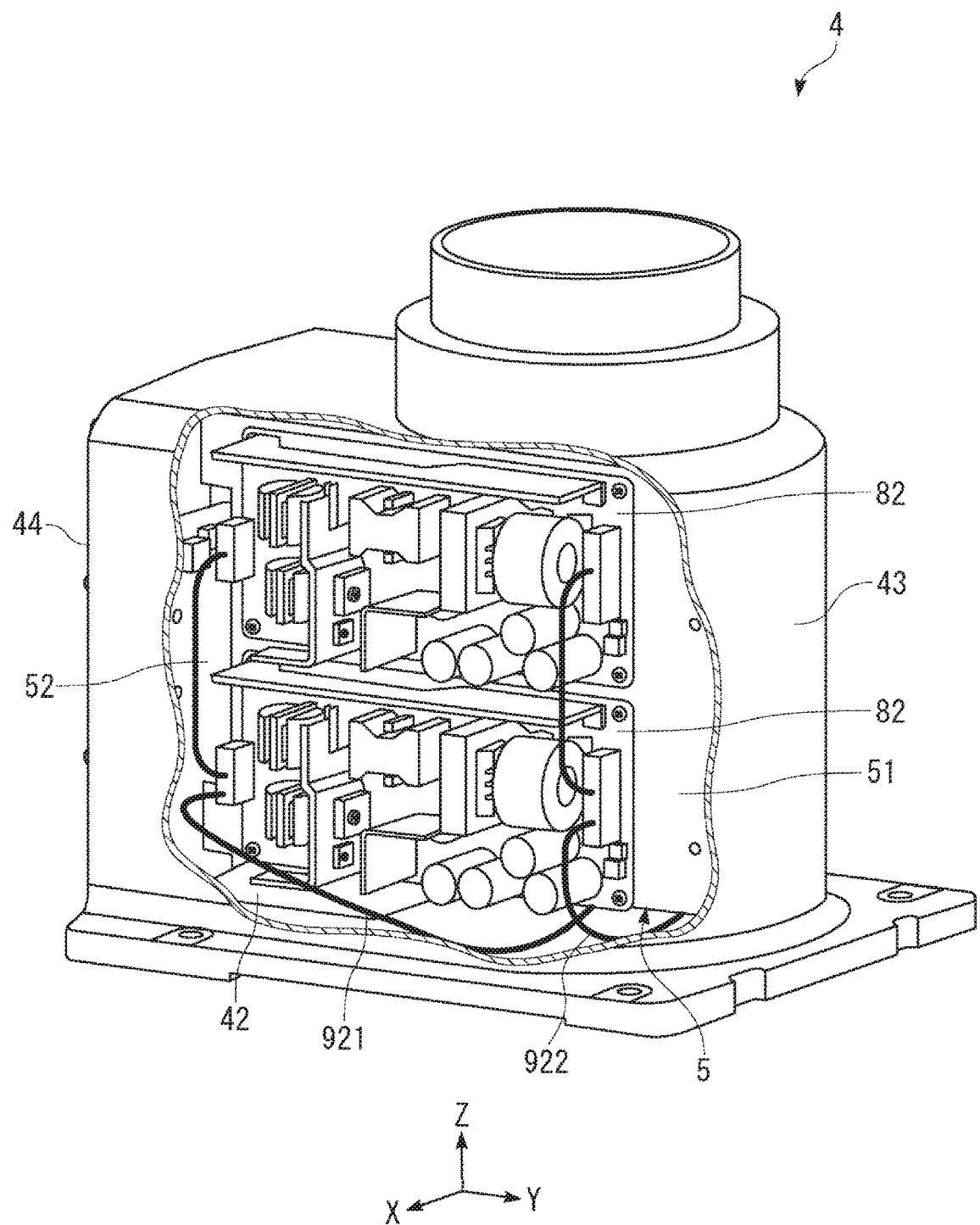
FIG. 10 is a cutaway view obtained by cutting away a part of the base of the robot shown in FIG. 1.
Figure 11:
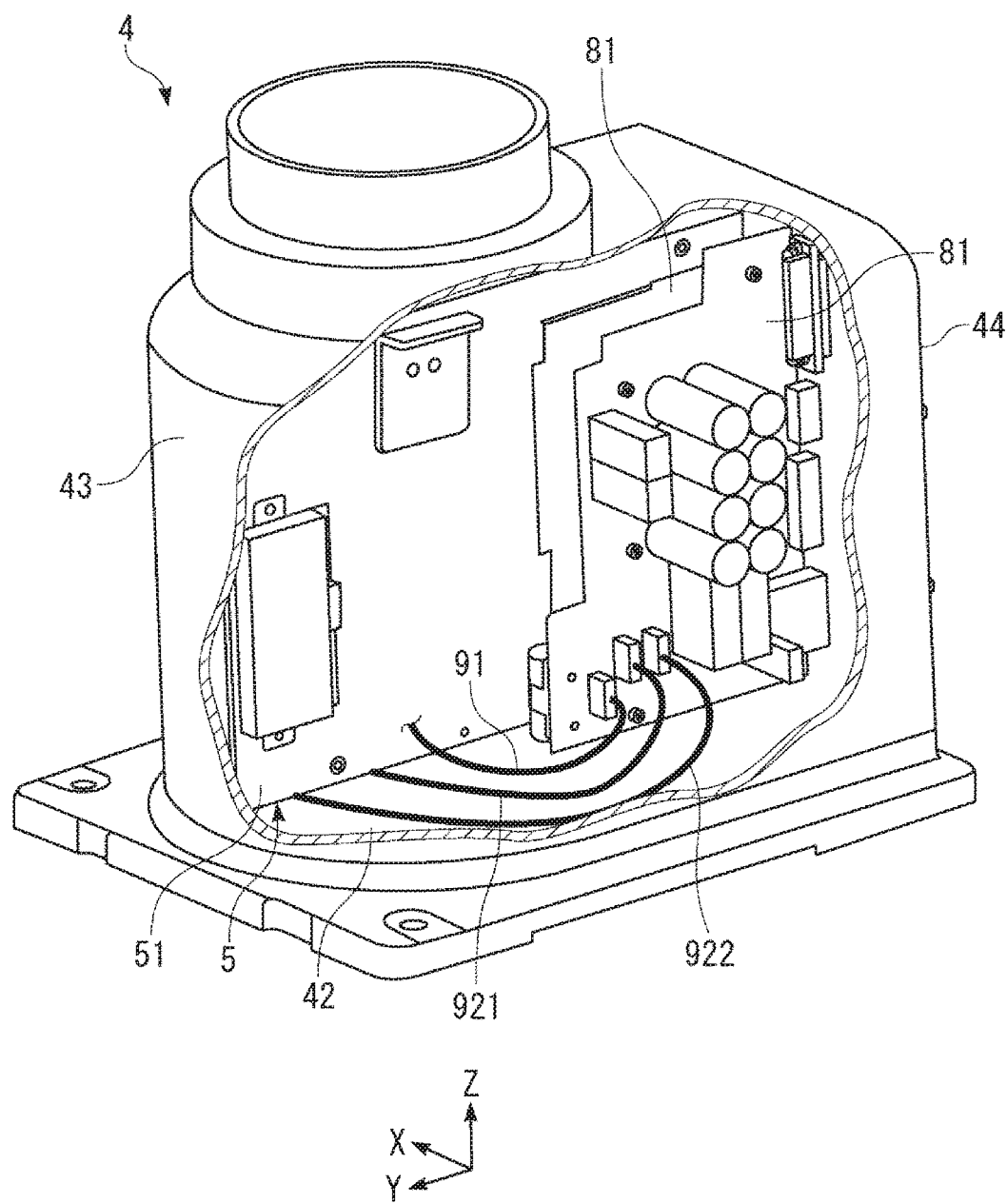
FIG. 11 is a cutaway view obtained by cutting away a part of the base of the robot shown in FIG. 1.
Figure 12:
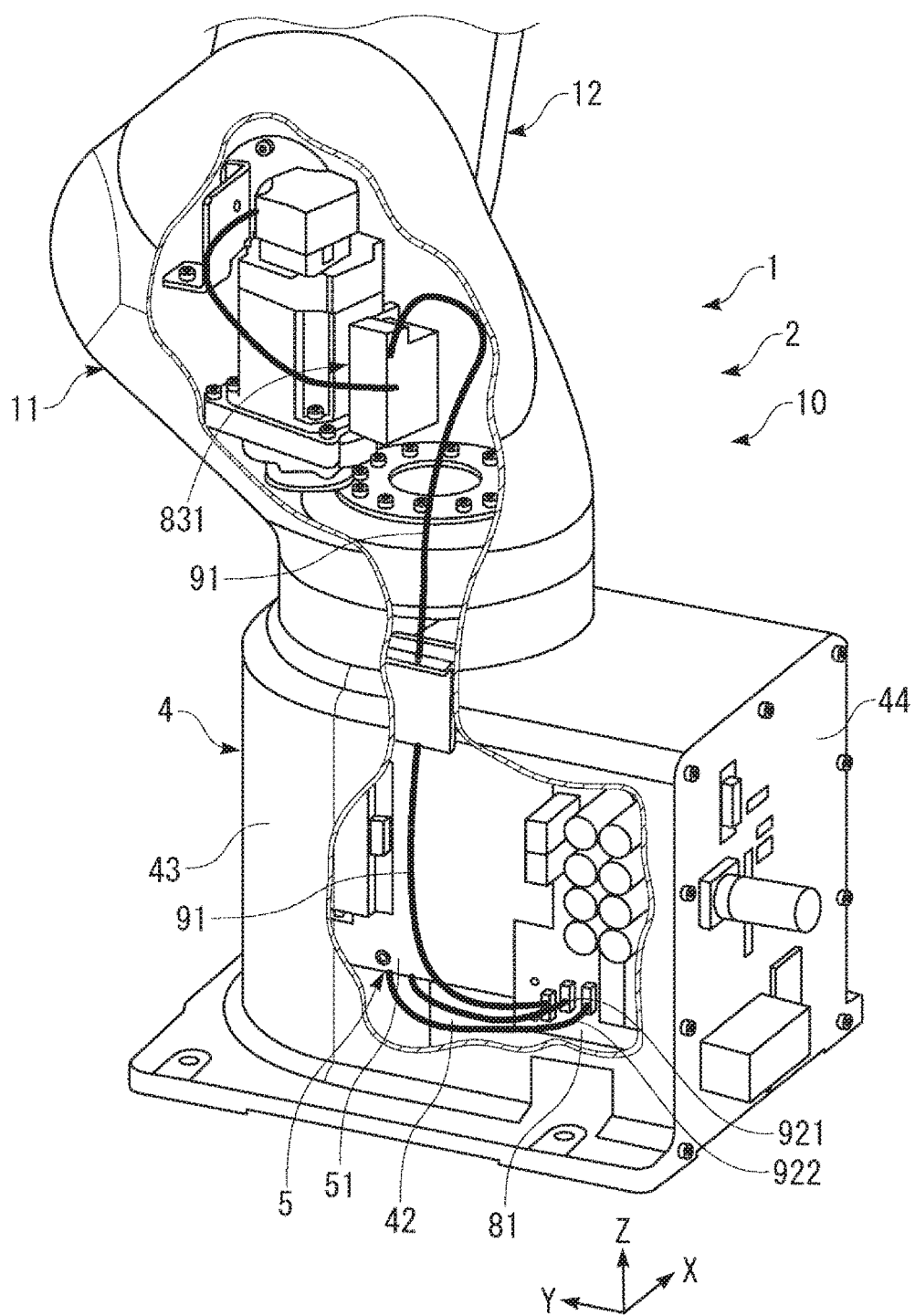
FIG. 12 is a cutaway view obtained by cutting away a part of the base and the first arm of the robot shown in FIG. 1.
Figure 13:
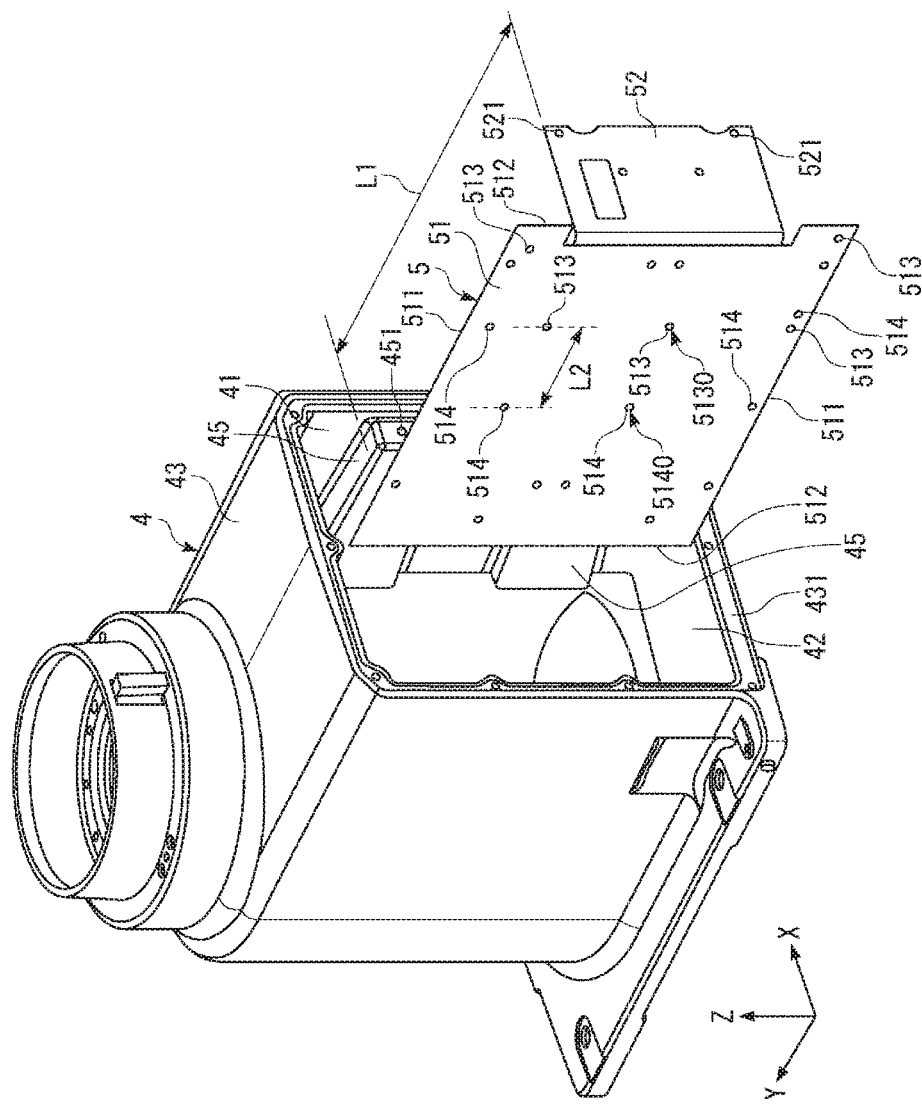
FIG. 13 is a perspective view showing the base of the robot shown in FIG. 1.
Figure 14:
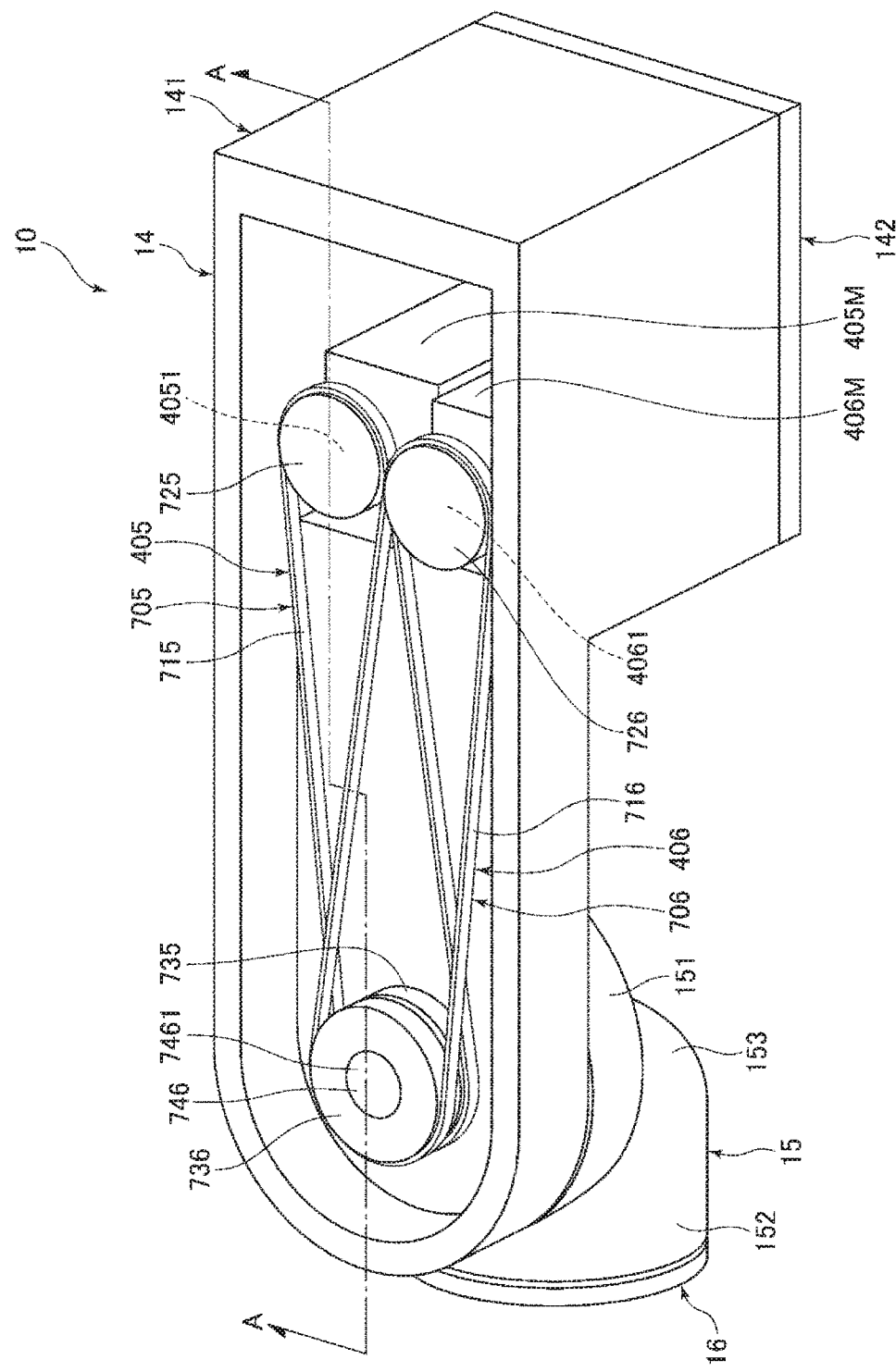
FIG. 14 is a perspective view showing a fourth arm, a fifth arm, a sixth arm, a fifth driving mechanism, and a sixth driving mechanism of the robot shown in FIG. 1.
Figure 15:
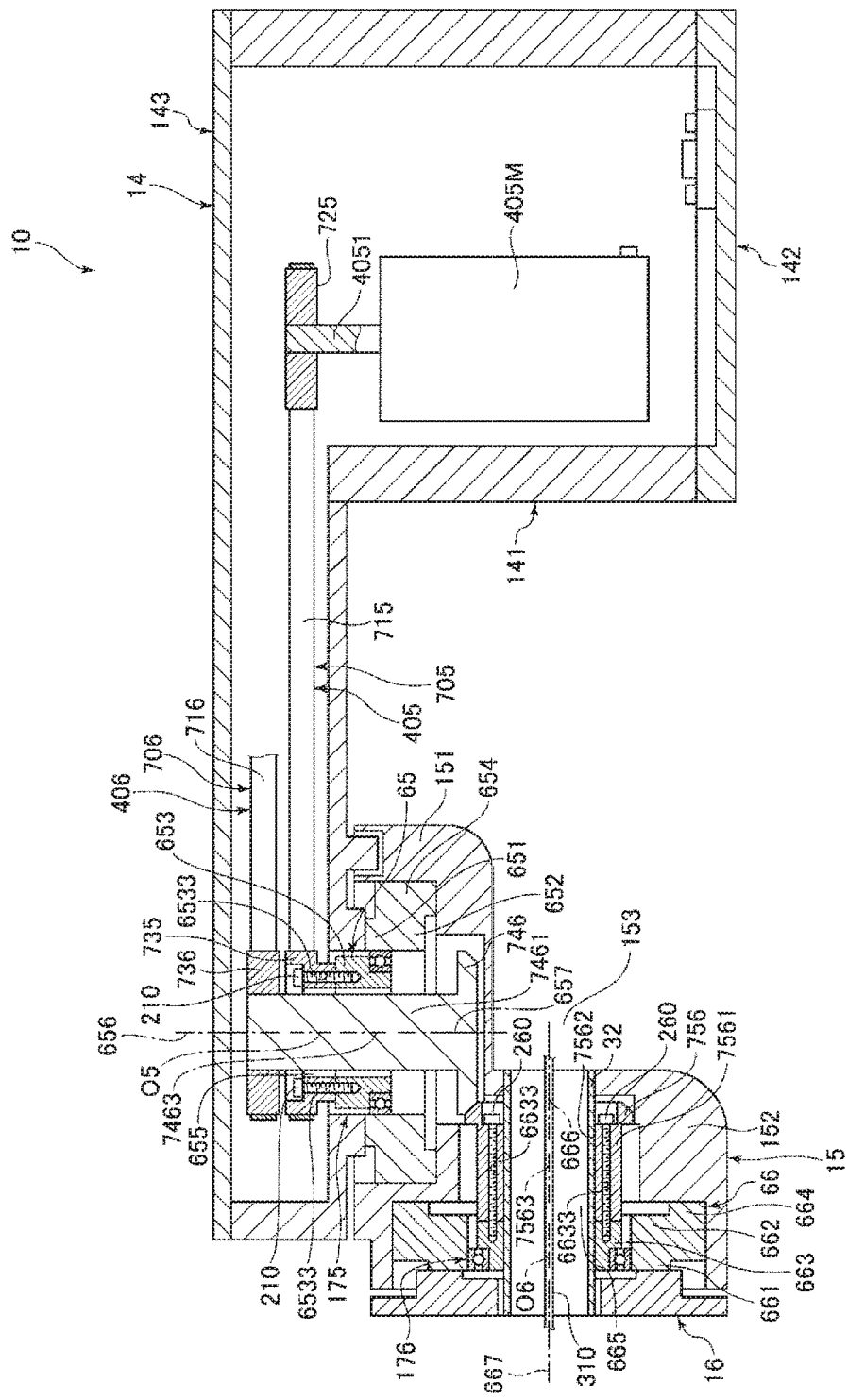
FIG. 15 is a sectional view taken along an A-A line in FIG. 14.
Figure 16:
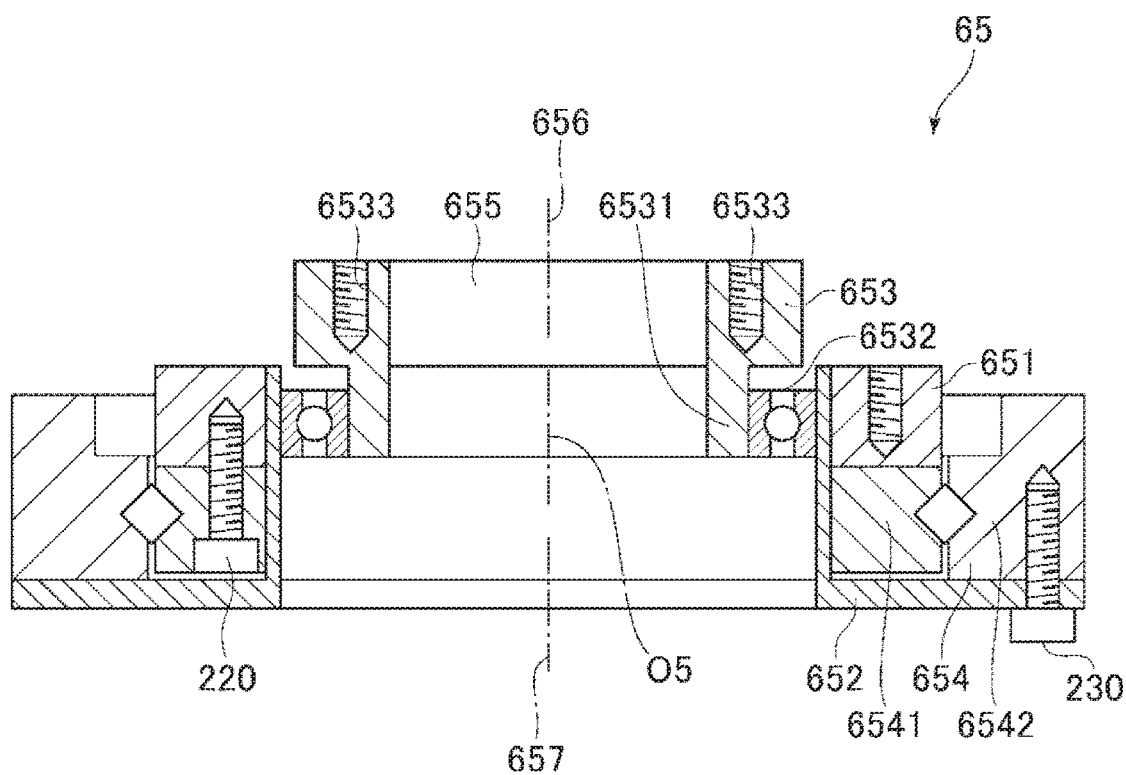
FIG. 16 is a sectional view showing a fifth reduction gear (an A reduction gear) of the robot shown in FIG. 1.
Figure 17:
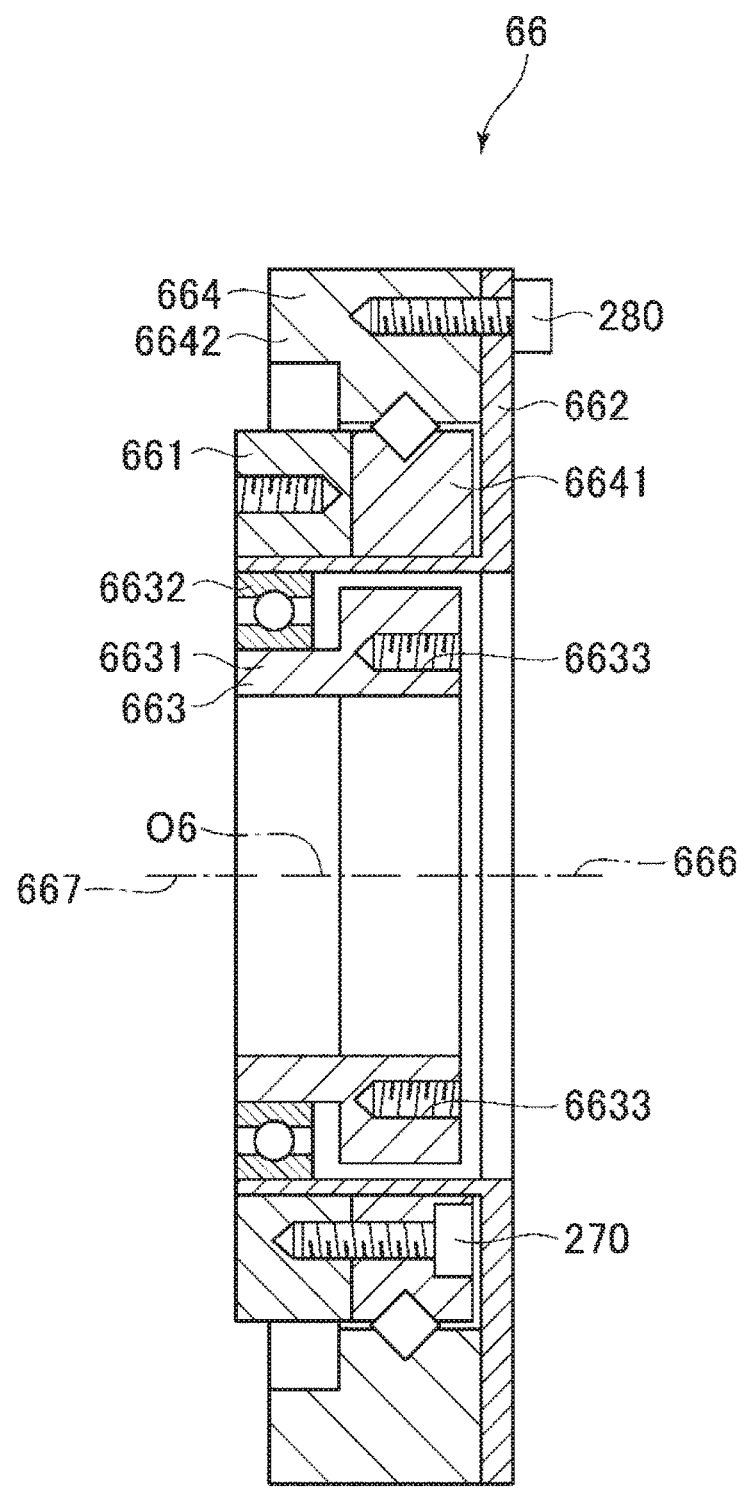
FIG. 17 is a sectional view showing a sixth reduction gear (a B reduction gear) of the robot shown in FIG. 1.

FIG. 1 is a perspective view showing a robot according to a first embodiment of the invention. FIG. 2 is a schematic diagram of the robot shown in FIG. 1. FIG. 3 is a block diagram showing a main part of the robot shown in FIG. 1. FIG. 4 is a perspective view showing a base and a first arm of the robot shown in FIG. 1. FIG. 5 is a perspective view showing the base of the robot shown in FIG. 1. FIG. 6 is a perspective view showing the base of the robot shown in FIG. 1. FIG. 7 is a perspective view showing the base of the robot shown in FIG. 1. FIG. 8 is a perspective view showing the base and the first arm of the robot shown in FIG. 1. FIG. 9 is a sectional view showing the base of the robot shown in FIG. 1. FIG. 10 is a cutaway view obtained by cutting away a part of the base of the robot shown in FIG. 1. FIG. 11 is a cutaway view obtained by cutting away a part of the base of the robot shown in FIG. 1. FIG. 12 is a cutaway view obtained by cutting away a part of the base and the first arm of the robot shown in FIG. 1. FIG. 13 is a perspective view showing the base of the robot shown in FIG. 1. FIG. 14 is a perspective view showing a fourth arm, a fifth arm, a sixth arm, a fifth driving mechanism, and a sixth driving mechanism of the robot shown in FIG. 1. FIG. 15 is a sectional view taken along an A-A line in FIG. 14. FIG. 16 is a sectional view showing a fifth reduction gear (an A reduction gear) of the robot shown in FIG. 1. FIG. 17 is a sectional view showing a sixth reduction gear (a B reduction gear) of the robot shown in FIG. 1. Note that, in FIG. 3, one of two control boards is representatively shown and one of two power supply boards is representatively shown. In FIG. 15, a rigid gear, a flexible gear, and a cross roller bearing of the fifth reduction gear (the A reduction gear) are schematically shown. Similarly, a rigid gear, a flexible gear, a cross roller bearing of the sixth reduction gear (the B reduction gear) are schematically shown (the same applies to the figures corresponding to the other embodiments).

In the following explanation, for convenience of explanation, the upper side in FIGS. 1 and 2 is referred to "upper" or "upward" and the lower side in FIGS. 1 and 2 is referred to as "lower" or "downward". The base side in FIGS. 1 and 2 is referred to as "proximal end" or "upstream" and the opposite side of the base side is referred to as "distal end" or "downstream". The up-down direction in FIGS. 1 and 2 is the vertical direction.

As shown in FIG. 1, as three axes orthogonal to one another, an X axis, a Y axis, and a Z axis are shown. The distal end side of arrows indicating the axes is referred to as "+ (positive)" and the proximal end side of the arrows is referred to as "− (negative)". The Z-axis direction is referred to as "vertical direction". An X-Y plane including the X axis and the Y axis is referred to as "horizontal plane". A direction in the X-Y plane (a direction along the X-Y plane) is referred to as "horizontal direction". A direction parallel to the X axis is referred to as "X direction (X-axis direction)" as well. A direction parallel to the Y axis is referred to as "Y direction (Y-axis direction")" as well. A direction parallel to the Z axis is referred to as "Z direction (Z-axis direction)" as well.

In this specification, "horizontal" is not limited to complete horizontality and includes inclination at an angle of ±5° or less with respect to the horizontality. Similarly, in this specification, "vertical" is not limited to complete verticality and includes inclination at an angle of ±5° or less with respect to the verticality. In this specification, "parallel" is not limited to complete parallelism of two lines (including axes) or surfaces and includes inclination at an angle of ±5° or less of the two lines or surfaces. In this specification "orthogonal" is not limited to complete orthogonality of two lines (including axes) or surfaces and includes inclination at an angle of ±5° or less of the two lines or surfaces.

A robot 1 shown in FIG. 1 can be used in kinds of work such as conveyance, assembly, and inspection of various kinds of work (objects).

As shown in FIGS. 1 to 3, the robot 1 includes a robot body 2 including a base 4 and a robot arm 10 displaceably coupled to (provided on) the base 4, a first driving mechanism 401, a second driving mechanism 402, a third driving mechanism 403, a fourth driving mechanism 404, a fifth driving mechanism 405, and a sixth driving mechanism 406, a control board 81, a power supply board 82, and driving boards 831, 832, 833, 834, 835, and 836.

The robot arm 10 includes a first arm 11, a second arm 12, a third arm 13, a fourth arm 14, a fifth arm 15, and a sixth arm 16. A wrist is configured by the fifth arm 15 and the sixth arm 16. An end effector (not shown in FIGS. 1 to 3) such as a hand can be detachably attached (connected) to the distal end of the sixth arm 16. An object (not shown in FIGS. 1 to 3) can be grasped (held) by the end effector. The object grasped (held) by the end effector is not particularly limited. Examples of the object include various objects such as an electronic component and an electronic device.

The end effector is not particularly limited if the end effector is capable of holding the object. Examples of the end effector include a hand capable of grasping (grabbing) the object and a suction head (a suction hand) that sucks to hold the object.

Note that a not-shown force detecting section (force detecting device) may be provided between the sixth arm 16 and the end effector. The force detecting section detects a force (including a translational force and a moment) applied to the end effector. The force detecting section is not particularly limited. For example, a six-axis force sensor capable of detecting force components (translational force components) in the respective axial directions of three axes orthogonal to one another and force components (rotational force components) around the respective three axes is used.

The robot 1 is a single-arm six-axis vertical articulated robot in which the base 4, the first arm 11, the second arm 12, the third arm 13, the fourth arm 14, the fifth arm 15, and the sixth arm 16 are coupled in this order from the proximal end side toward the distal end side. The first arm 11 is arm on the most proximal end side (upstream side). The sixth arm 16 is an arm on the most distal end side (downstream side). Consequently, with a configuration explained below, a reduction in the size and a reduction in the weight of the distal end portion of the robot arm 10 can be achieved. Note that the shapes of the first to sixth arms 11 to 16 are not respectively particularly limited and can be set as appropriate. The lengths of the first to sixth arms 11 to 16 are not respectively particularly limited and can be set as appropriate.

In the following explanation, the first arm 11, the second arm 12, the third arm 13, the fourth arm 14, the fifth arm 15, and the sixth arm 16 are respectively referred to as "arms" as well. A first rotation axis O1, a second rotation axis O2, a third rotation axis O3, a fourth rotation axis O4, a fifth rotation axis O5, and a sixth rotation axis O6 are respectively referred to as "rotation axes" as well. The first driving mechanism 401, the second driving mechanism 402, the third driving mechanism 403, the fourth driving mechanism 404, the fifth driving mechanism 405, and the sixth driving mechanism 406 are respectively referred to as "driving mechanisms" as well. A first motor 401M, a second motor 402M, a third motor 403M, a fourth motor 404M, a fifth motor 405M, and a sixth motor 406M are respectively referred to as "motors" as well. A first reduction gear 61, a second reduction gear (not shown in FIGS. 1 to 3), a third reduction gear (not shown in FIGS. 1 to 3), a fourth reduction gear (not shown in FIGS. 1 to 3), a fifth reduction gear 65, and a sixth reduction gear 66 are respectively referred to as "reduction gears" as well.

The base 4 and the first arm 11 are coupled via a joint 171. The first arm 11 has the first rotation axis O1 parallel to the vertical direction as a rotating center and is rotatable with respect to the base 4 around the first rotation axis O1. The first rotation axis O1 corresponds with the normal of the upper surface of a floor 101, which is a setting surface of the base 4. The first rotation axis O1 is a rotation axis present on the most upstream side of the robot 1. The first arm 11 turns according to driving of the first driving mechanism 401 including the motor (the first motor) 401M and the reduction gear 61 (the first reduction gear) (see FIG. 8). The motor 401M is an example of a driving source that generates a driving force for rotating the first arm 11. The motor 401M is controlled by the control board 81 via a motor driver 301 (a first motor driver) of the driving board 831 (a first driving board). Note that the reduction gear 61 may be omitted.

The robot 1 includes a braking mechanism (not shown in FIGS. 1 to 3) configured to brake rotating of an output shaft of the motor 401M (the first arm 11). The braking mechanism is controlled by the control board 81. With the braking mechanism, it is possible to prevent the output shaft of the motor 401M from rotating and appropriately retain the posture of the first arm 11.

The first arm 11 and the second arm 12 are coupled via a joint 172. The second arm 12 has the second rotation axis O2 parallel to the horizontal axis as a rotating center and is rotatable with respect to the first arm 11 around the second rotation axis O2. The second arm 12 is cantilevered at the distal end portion of the first arm 11. Consequently, a reduction in the size and a reduction in the weight of the robot 1 can be achieved. The second rotation axis O2 is parallel to an axis orthogonal to the first rotation axis O1 (the axial direction of the second rotation axis O2 and the axial direction of the first rotation axis O1 are different). The second arm 12 turns according to driving of the second driving mechanism 402 including the motor (the second motor) 402M and the reduction gear (the second reduction gear) (not shown in FIGS. 1 to 3). The motor 402M is an example of a driving source that generates a driving force for rotating the second arm 12. The motor 402M is controlled by the control board 81 via a motor driver 302 (a second motor driver) of the driving board 832 (a second driving board). Note that the reduction gear may be omitted. The second rotation axis O2 may be orthogonal to the first rotation axis O1.

The robot 1 includes a braking mechanism (not shown in FIGS. 1 to 3) configured to brake rotating of an output shaft of the motor 402M (the second arm 12). The braking mechanism is controlled by the control board 81. With the braking mechanism, it is possible to prevent the output shaft of the motor 402M from rotating and appropriately retain the posture of the second arm 12.

The second arm 12 and the third arm 13 are coupled via a joint 173. The third arm 13 has the third rotation axis O3 parallel to the horizontal axis as a rotating center and is rotatable with respect to the second arm 12 around the third rotation axis O3. The third arm 13 is cantilevered at the distal end portion of the second arm 12. Consequently, a reduction in the size and a reduction in the weight of the robot 1 can be achieved. The third rotation axis O3 is parallel to the second rotation axis O2. The third arm 13 turns according to driving of the third driving mechanism 403 including the motor (the third motor) 403M and the reduction gear (the third reduction gear) (not shown in FIGS. 1 to 3). The motor 403M is an example of a driving source that generates a driving force for rotating the third arm 13. The motor 403M is controlled by the control board 81 via a motor driver 303 (a third motor driver) of the driving board 833 (a third driving board). Note that the reduction gear may be omitted.

The robot 1 includes a braking mechanism (not shown in FIGS. 1 to 3) configured to brake rotating of an output shaft of the motor 403M (the third arm 13). The braking mechanism is controlled by the control board 81. With the braking mechanism, it is possible to prevent the output shaft of the motor 403M from rotating and appropriately retain the posture of the third arm 13.

The third arm 13 and the fourth arm 14 are coupled via a joint 174. The fourth arm 14 has the fourth rotation axis O4 parallel to the center axis direction of the third arm 13 as a rotating center and is rotatable with respect to the third arm 13 around the fourth rotation axis O4. The fourth rotation axis O4 is orthogonal to the third rotation axis O3 (the axial direction of the fourth rotation axis O4 and the axial direction of the third rotation axis O3 are different). The fourth arm 14 turns according to driving of the fourth driving mechanism 404 including the motor (the fourth motor) 404M and a reduction gear (a fourth reduction gear) (not shown in FIGS. 1 to 3). The motor 404M is an example of a driving source that generates a driving force for rotating the fourth arm 14. The motor 404M is controlled by the control board 81 via the motor driver 304 (the fourth motor driver) of the driving board 834 (a fourth driving board). Note that the reduction gear may be omitted. The fourth rotation axis O4 may be parallel to an axis orthogonal to the third rotation axis O3.

The robot 1 includes a braking mechanism (not shown in FIGS. 1 to 3) configured to brake rotating of an output shaft of the motor 404M (the fourth arm 14). The braking mechanism is controlled by the control board 81. With the braking mechanism, it is possible to prevent the output shaft of the motor 404M from rotating and appropriately retain the posture of the fourth arm 14.

The fourth arm 14 and the fifth arm 15 are coupled via a joint 175. The fifth arm 15 has the fifth rotation axis O5 as a rotating center and is rotatable with respect to the fourth arm 14 around the fifth rotation axis O5. The fifth arm 15 is cantilevered at the distal end portion of the fourth arm 14. Consequently, a reduction in the size and a reduction in the weight of the robot 1 can be achieved. The fifth rotation axis O5 is orthogonal to the fourth rotation axis O4 (the axial direction of the fifth rotation axis O5 and the axial direction of the fourth rotation axis are different). The fifth arm 15 turns according to driving of the fifth driving mechanism 405 including the motor (the fifth motor) 405M and a reduction gear 65 (a fifth reduction gear) (see FIG. 15). The motor 405M is an example of a driving source that generates a driving force for rotating the fifth arm 15. The motor 405M is controlled by the control board 81 via a motor driver 305 (a fifth motor driver) of the driving board 835 (the fifth driving board). Note that the reduction gear may be omitted. The fifth rotation axis O5 may be parallel to an axis orthogonal to the fourth rotation axis O4.

The robot 1 includes a braking mechanism (not shown in FIGS. 1 to 3) configured to brake rotating of an output shaft of the motor 405M (the fifth arm 15). The braking mechanism is controlled by the control board 81. With the braking mechanism, it is possible to prevent the output shaft of the motor 405M from rotating and appropriately retain the posture of the fifth arm 15.

The fifth arm 15 and the sixth arm 16 are coupled via a joint 176. The sixth arm 16 has the sixth rotation axis O6 as a rotating center and is rotatable with respect to the fifth arm 15 around the sixth rotation axis O6. The sixth rotation axis O6 is orthogonal to the fifth rotation axis O5 (the axial direction of the sixth rotation axis O6 and the axial direction of the fifth rotation axis O5 are different). The sixth arm 16 turns according to driving of the sixth driving mechanism 406 including the motor (the sixth motor) 406M and a reduction gear 66 (a sixth reduction gear) (see FIG. 15). The motor 406M is an example of a driving source that generate a driving force for rotating the sixth arm 16. The motor 406M is controlled by the control board 81 via a motor driver 306 (a sixth motor driver) of the driving board 836 (a sixth driving board). Note that the sixth rotation axis O6 may be parallel to an axis orthogonal to the fifth rotation axis O5.

The robot 1 includes a braking mechanism (not shown in FIGS. 1 to 3) configured to brake rotating of an output shaft of the motor 406M (the sixth arm 16). The braking mechanism is controlled by the control board 81. With the braking mechanism, it is possible to prevent the output shaft of the motor 406M from rotating and appropriately retain the posture of the sixth arm 16.

In the driving mechanisms 401 to 406, a first angle sensor 411, a second angle sensor 412, a third angle sensor 413, a fourth angle sensor 414, a fifth angle sensor 415, and a sixth angle sensor 416 are provided in the respective motors or the respective reduction gears. In the following explanation, the first angle sensor 411, the second angle sensor 412, the third angle sensor 413, the fourth angle sensor 414, the fifth angle sensor 415, and the sixth angle sensor 416 are respectively referred to as "angle sensors" as well. The angle sensors are not particularly limited. For example, an encoder such as a rotary encoder can be used. Rotation (rotating) angles of output shafts (rotating shafts) of the motors or the reduction gears of the driving mechanisms 401 to 406 are respectively detected by the angle sensors 411 to 416.

The motors of the driving mechanisms 401 to 406 are not respectively particularly limited. For example, a servomotor such as an AC servomotor or a DC servomotor is desirable.

The reduction gears of the driving mechanisms 401 to 406 are not respectively particularly limited. Examples of the reduction gears include a reduction gear of a so-called "planetary gear type" configured by a plurality of gears and a wave reduction gear (a wave reduction gear) called harmonic drive ("harmonic drive" is a registered trademark). The wave reduction gear is desirable.

The braking mechanism that brakes the motors 401M to 406M are not respectively particularly limited. However, for example, an electromagnetic brake is desirable. The braking mechanisms may be respectively omitted.

The driving mechanisms 401 to 406, the angle sensors 411 to 416, and the braking mechanisms are respectively electrically connected to the control board 81.

The control board 81 can operate the arms 11 to 16 independent from one another, that is, can control the driving mechanisms 401 to 406 independently from one another via the motor drivers 301 to 306. In this case, the control board 81 performs detection with the angle sensors 411 to 416 and the force detecting section (not shown in FIGS. 1 to 3) and respectively controls driving of the driving mechanisms 401 to 406, for example, angular velocities and rotation angles on the basis of a result of the detection (detection information). A control program for the control is stored in advance in a ROM or the like of the control board 81.

In this embodiment, the base 4 is a portion located in the bottom in the vertical direction of the robot 1 and fixed to (set in) the floor 101 or the like of a setting space. A method of fixing the base 4 is not particularly limited. Examples of the method include a fixing method by a plurality of bolts. The floor 101 of a portion to which the base 4 is fixed is a plane (a surface) parallel to the horizontal plane. However, the floor 101 is not limited to this.

In work, the control board 81 of the robot 1 controls driving (operation) of the robot 1 with position control, force control, or the like on the basis of outputs of the angle sensors 411 to 416 and the force detecting section (not shown in FIGS. 1 to 3), that is, detection results (detected angles) of the angle sensors 411 to 416, a detection result (a detected force) of the force detecting section, and the like.

The position control is control of the operation of the robot 1 for moving the end effector to a target position in a target posture on the basis of information concerning the position and the posture of the end effector of the robot 1. Instead of the end effector, the distal end portion of the robot arm 10, an object grasped by the end effector, or the like may be used. The information concerning the position and the posture of the end effector can be calculated on the basis of, for example, the detection results of the angle sensors 411 to 416.

The force control is control of the operation of the robot 1 for, for example, changing the position and the posture of the end effector or pushing, pulling, or rotating the end effector on the basis of the detection result of the force detecting section. The force control includes, for example, impedance control and force trigger control.

In the force trigger control, the control board 81 performs detection with the force detecting section and moves (including a change of the posture), that is, operates the robot arm 10 until a predetermined force is detected by the force detecting section.

The impedance control includes following control. First, briefly explained, in the impedance control, the control board 81 controls the operation of the robot arm 10 (the robot 1) to maintain a force applied to the distal end portion of the robot arm 10 at a predetermined force as much as possible, that is, maintain a force in a predetermined direction detected by the force detecting section at a target value (including 0) as much as possible. Consequently, for example, when the impedance control is performed on the robot arm 10, an object (not shown in FIGS. 1 to 3) grasped by the end effector of the robot arm 10 moves following another object (not shown in FIGS. 1 to 3) in the predetermined direction.

The robot 1 is briefly explained above. The robot 1 is explained in detail below.

As shown in FIGS. 4 to 8, the base 4 is formed in a box shape and includes, on the inside, a housing space 42 in which an object can be housed (disposed). In this case, the entire internal space (inside) of the base 4 may be grasped as the housing space 42 or a part of the internal space (the inside) may be grasped as the housing space 42. The base 4 includes a main body section 43 and a lid body 44. The lid body 44 is detachably attached to a rear end face 431 (a surface on the negative side in the Y direction) of the main body section 43. In this embodiment, the lid body 44 is detachably attached to the main body section 43 by screwing. Note that a method of attaching the lid body 44 to the main body section 43 is not limited to the screwing. Examples of the method include fitting.

The robot 1 includes control boards 81 configured to control the driving of the robot body 2 and power supply boards 82 (see FIG. 10) configured to supply electric power to the control boards 81.

The number of the control boards 81 is not particularly limited and is set as appropriate according to conditions. In this embodiment, the number of the control boards 81 is two. The two control boards 81 are disposed at a predetermined interval to overlap when viewed from the X direction and are electrically connected to each other. The control boards 81 may have the same configuration or may have different configurations. In this embodiment, the control boards 81 have functions different from each other. In the following explanation, one of the two control boards 81 is representatively explained. Note that the number of the control boards 81 may be one or may be three or more.

The number of the power supply boards 82 is not particularly limited and is set as appropriate according to conditions. In this embodiment, the number of the power supply boards 82 is two. The two power supply boards 82 are disposed in the Z direction at a predetermined interval and electrically connected to each other. The power supply boards 82 may have the same configuration or may have different configurations. In the following explanation, one of the two power supply boards 82 is representatively explained. Note that the number of the power supply boards 82 may be one or may be three or more.

The control board 81 includes a substrate on which wires are provided and a CPU (Central Processing Unit), which is an example of a processor, provided on the substrate, a RAM (Random Access Memory), and a ROM (Read Only Memory) in which computer programs are stored. In this embodiment, various computer programs are executed by the CPU, whereby functions of a control section configured to control driving of the robot body 2 are attained. Functions of a storing section configured to store various kinds of information (including data and computer programs) are attained by the RAM and the ROM.

The power supply board 82 includes a substrate on which wires are provided and a circuit provided on the substrate and configured to convert a voltage (electric power) supplied from the outside into a predetermined value (e.g., step down the voltage).

The driving board 831 is a circuit board configured to drive the motor 401M on the basis of a command of the control board 81. The driving board 831 includes a substrate on which wires are provided and the motor driver 301 provided on the substrate.

The driving board 832 is a circuit board configured to drive the motor 402M on the basis of a command of the control board 81. The driving board 832 includes a substrate on which wires are provided and the motor driver 302 provided on the substrate.

The driving board 833 is a circuit board configured to drive the motor 403M on the basis of a command of the control board 81. The driving board 833 includes a substrate on which wires are provided and the motor driver 303 provided on the substrate.

The driving board 834 is a circuit board configured to drive the motor 404M on the basis of a command of the control board 81. The driving board 834 includes a substrate on which wires are provided and the motor driver 304 provided on the substrate.

The driving board 835 is a circuit board configured to drive the motor 405M on the basis of a command of the control board 81. The driving board 835 includes a substrate on which wires are provided and the motor driver 305 provided on the substrate.

The driving board 836 is a circuit board configured to drive the motor 406M on the basis of a command of the control board 81. The driving board 836 includes a substrate on which wires are provided and the motor driver 306 provided on the substrate.

As shown in FIGS. 10 and 11, the control board 81 and the power supply board 82 are electrically connected (hereinafter simply referred to as "connected" as well) by a wire 921 (a second wire) and connected by a wire 922 (a second wire). The wire 921 is a power supply line used for delivering a voltage (electric power), which is input to the control board 81 from the outside, from the control board 81 to the power supply board 82. The wire 922 is a power supply line used to deliver a voltage, which is converted by the power supply board 82, (e.g., a stepped-down voltage) from the power supply board 82 to the control board 81. In this embodiment, the wires 921 and 922 are respectively provided as, for example, cables including tubes having insulation.

As shown in FIG. 12, the control board 81 and the driving board 831 are connected by a wire 91 (a first wire). The wire 91 is a power supply line used for delivering a voltage (a command) for driving the motor 401M from the control board 81 to the driving board 831. Similarly, the control board 81 and each of the driving boards 832 to 836 are connected by a wire (not shown in FIG. 12). In this embodiment, the wires connected to the wire 91 and the driving boards 832 to 836 are respectively provided as, for example, cables including tubes having insulation.

As shown in FIGS. 4 to 6, the robot 1 includes a supporting member 5 configured to respectively detachably support the control board 81 and the power supply board 82. The supporting member 5 is provided in the housing space 42 attachably to and detachably from the base 4. Consequently, the control board 81 and the power supply board 82 are respectively provided in the housing space 42. In this embodiment, the supporting member 5 is detachably attached to the base 4 by screwing. Note that a method of attaching the supporting member 5 to the base 4 is not limited to the screwing. Examples of the method include fitting.

In this way, the robot 1 and the control board 81 and the power supply board 82 (a control device) are integrated. Therefore, a reduction in the size of the robot 1 (a reduction in the size of the entire robot system) can be achieved. Because the supporting member 5 is detachably attachable to the base 4, assembly (manufacturing) of the robot 1, maintenance of the control board 81 and the power supply board 82, and the like can be easily and quickly performed. Note that the supporting member 5 may have other structures. The supporting member 5 may not be detachable from the base 4.

The entire shape of the supporting member 5 is formed in a tabular shape. That is, the supporting member 5 includes a main substrate 51 (a tabular section) formed in a tabular shape. The shape of the main substrate 51 is not particularly limited. However, in this embodiment, the main substrate 51 is a rectangle (a square) in a plan view of the main substrate 51. Note that examples of the shape of the main substrate 51 include, besides the square, polygons such as a triangle, a pentagon, and a hexagon, a circle, and an ellipse.

A rear substrate 52 is provided in a rear part (on the negative side in the Y direction) of the main substrate 51. The rear substrate 52 is disposed to be perpendicular to the main substrate 51. In this embodiment, the main substrate 51 and the rear substrate 52 are formed by bending one substrate. However, the main substrate 51 and the rear substrate 52 are not limited to this and, for example, may be formed of separate members.

The rear substrate 52 is a member screwed to the base 4. Two through-holes 521 are formed in the rear substrate 52.

Two ribs 45 are formed on one sidewall 41 (on the positive side in the X direction) in the housing space 42 of the main body section 43 of the base 4 (see FIG. 7). The ribs 45 respectively extend in the Y direction. The ribs 45 are disposed side by side in the Z direction at a predetermined interval.

In the ribs 45, female screws 451 are respectively formed on end faces on the negative side in the Y direction. Two male screws (not shown in FIG. 7) are respectively inserted through the through-holes 521 corresponding to the male screws and screwed in the female screws 451 of the ribs 45 corresponding to the male screws, whereby the supporting member 5 is detachably attached to the base 4. Note that the supporting member 5 may be detachably attached to not only the main body section 43 but also the lid body 44.

The supporting member 5 is disposed such that the main substrate 51 extends along the axial direction of the first rotation axis O1 (the vertical direction). In this embodiment, the supporting member 5 is disposed such that the main substrate 51 and the Z axis (the vertical line) are parallel, specifically, a short side 512 of the main substrate 51 and the Z axis are parallel and a long side 511 of the main substrate 51 and the Y axis are parallel. Consequently, the control board 81 and the power supply board 82 can be disposed along the vertical direction. Accordingly, dust and the like are prevented from accumulating on the control board 81 and the power supply board 82.

Note that the supporting member 5 may be disposed in other postures, for example, a posture in which the main substrate 51 is inclined with respect to the vertical direction and a posture in which the main substrate 51 and the X-Y plane (the horizontal plane) are parallel.

As shown in FIGS. 7 and 9, the base 4 includes a posture restriction 47 configured to restrict the posture of the supporting member 5 attached to (provided in) the housing space 42. In this embodiment, the posture restriction 47 is configured by a rib formed on a front wall 46 in the housing space 42 of the main body section 43.

The posture restriction 47 is disposed in an upper part (on the positive side in the Z direction) of the housing space 42 and extends in the X direction. The posture restriction 47 includes a groove 471 into which the distal end portion of the main substrate 51 of the supporting member 5 is inserted. The groove 471 extends in the Z direction and is opened to the negative side in the Y direction and the negative side in the Z direction. Therefore, the posture restriction 47 supports the distal end portion of the main substrate 51 of the supporting member 5 from the positive side and the negative side in the X direction, the positive side in the Y direction, and the positive side in the Z direction to thereby restrict the posture of the supporting member 5. Consequently, the posture of the supporting member 5 can be stabilized. When the supporting member 5 is attached to the base 4, the supporting member 5 is inserted into the groove 471, whereby the posture of the supporting member 5 is stabilized. Attachment work of the supporting member 5 can be easily and quickly performed. Note that the groove 471 may be bottomless, that is, may be opened to the positive side in the Y direction or may be opened to the positive side in the Z direction.

A constituent material of the supporting member 5 is not particularly limited. However, a metal material (including an alloy) is desirable. A material having high thermal conductivity such as aluminum or an aluminum alloy is more desirably used. By using the material having the high thermal conductivity, heat generated in the control board 81 and the power supply board 82 can be efficiently allowed to escape from the supporting member 5 to the base 4.

In this embodiment, the control board 81 and the power supply board 82 are respectively detachably attached to the main substrate 51 of the supporting member 5 by screwing. The control board 81 is attached to one surface of the main substrate 51. The power supply board 82 is attached to the other surface of the main substrate 51. Note that a method of respectively attaching the control board 81 and the power supply board 82 to the supporting member 5 is not limited to the screwing.

The supporting member 5 is configured to be capable of supporting the control board 81 in a first position (a position where through-holes 811 of the control board 81 and female screws 513 of a first female screw group 5130 of the supporting member 5 corresponding to the through-holes 811 correspond) shown in FIGS. 4 and 9 and a second position (a position where the through-holes 811 of the control board 81 and female screws 514 of a second female screw group 5140 of the supporting member 5 corresponding to the through-holes 811 correspond) different from the first position. That is, the position (the supporting position) of the control board 81 in the supporting member 5 can be changed to the first position and the second position. In this embodiment, the first position is located further on the negative side in the Y direction than the second position. Consequently, the control board 81 can be disposed in one of the first position and the second position (the position of the control board 81 in the base 4 can be changed) according to a purpose, a use, or the like. When the position of the control board 81 in the base 4 is changed, compared with when the position of the supporting member 5 with respect to the base 4 is changed, because the position of the control board 81 with respect to the supporting member 5 is changed, work can be easily and quickly performed.

Specifically, as shown in FIG. 5, the first female screw group 5130 configured by a plurality of female screws 513 and the second female screw group 5140 configured by a plurality of female screws 514 are formed in the main substrate 51 of the supporting member 5.

The disposition of the female screws 513 in the first female screw group 5130 and the disposition of the female screws 514 in the second female screw group 5140 are the same. The first female screw group 5130 is located further on the negative side in the Y direction than the second female screw group 5140.

On the other hand, as shown in FIGS. 4 and 9, in the control board 81, a through-hole group 8110 configured by a plurality of through-holes 811 that can be selectively disposed in one of the positions of the female screws 513 and the positions of the female screws 514 is formed.

When the control board 81 is attached to the first position of the supporting member 5, the through-holes 811 of the control board 81 and the female screws 513 of the first female screw group 5130 of the supporting member 5 corresponding to the through-holes 811 are aligned. A plurality of male screws (not shown in FIGS. 4 and 9) are respectively inserted into the through-holes 811 corresponding to the male screws and screwed in the female screws 513 corresponding to the male screws. When the control board 81 is disposed in the first position, a connector of the control board 81 projects to the outside from an opening of the lid body 44 of the base 4.

When the control board 81 is attached to the second position of the supporting member 5, the through-holes 811 of the control board 81 and the female screws 514 of the second female screw group 5140 of the supporting member 5 corresponding to the through-holes 811 are aligned. A plurality of male screws (not shown in FIGS. 4 and 9) are respectively inserted into the through-holes 811 corresponding to the male screws and screwed in the female screws 514 corresponding to the male screws. When the control board 81 is disposed in the second position, the connector of the control board 81 is disposed in the housing space 42 of the base 4.

A specific use example is explained. When the control board 81 is disposed in the first position, the robot 1 is normally used.

When the control board 81 is disposed in the second position, a waterproof connector is electrically connected to the connector of the control board 81 via a wire. The waterproof connector is projected to the outside from the opening of the lid body 44 of the base 4. A sealing member (not shown in FIGS. 4 and 9) is provided in a necessary part such as a part between the main body section 43 of the base 4 and the lid body 44 to liquid-tightly seal the housing space 42. A sealing member (not shown in FIGS. 4 and 9) is provided in another necessary part of the robot to liquid-tightly seal a portion corresponding to the necessary part. Consequently, for example, the robot 1 having a waterproof function can be realized.

Note that position of the control board 81 with respect to the supporting member 5 is not limited to the first position and the second position and may be changeable to, for example, three or more positions. The position of the control board 81 with respect to the supporting member 5 may be unchangeable.

As explained above, the first arm 11 has the first rotation axis O1 as the rotating center and is rotatable with respect to the base 4 around the first rotation axis O1.

As shown in FIG. 8, the first driving mechanism 401 configured to turn the first arm 11 includes the motor 401M, the reduction gear 61, a pulley 72 (a driving pulley), a pulley 73 (a driven pulley), and a belt 71 (a timing belt) configured to transmit a driving force of the motor 401M to the base 4 via the reduction gear 61.

The pulley 72 is coupled (connected) to an output shaft (a rotating shaft) of the motor 401M. The pulley 73 is coupled to an input shaft of the reduction gear 61. The belt 71 is an endless belt and is laid over the pulley 72 and the pulley 73. An output shaft of the reduction gear 61 is coupled to the base 4. The driving force (rotation) of the motor 401M is transmitted to the reduction gear 61 by the pulleys 72 and 73 and the belt 71. Rotating speed of the motor 401M is reduced by the reduction gear 61 and transmitted to the base 4.

In this way, the first driving mechanism 401 includes the belt 71 configured to transmit the driving force of the motor 401M. Therefore, the motor 401M can be disposed in a position separated from the joint 171 that couples the base 4 and the first arm 11. Consequently, the motor 401M can be disposed in a desired position of the first arm 11.

The first driving mechanism 401 is provided on the inside of the first arm 11. Specifically, the first motor 401M, the belt 71, the pulleys 72 and 73, and a part of the reduction gear 61 of the first driving mechanism 401 are provided on the inside of the first arm 11. Consequently, compared with when the first driving mechanism 401, which is a heat source, is provided in the housing space 42 of the base 4, the temperature of the housing space 42 can be reduced. Accordingly, influence by the heat of the control board 81 can be reduced. Note that, in the first driving mechanism 401, the first motor 401M only has to be provided in the first arm 11. The entire or a part of each of the belt 71, the pulleys 72 and 73, and the reduction gear 61 may be provided in, for example, the housing space 42 of the base 4.

The driving board 831 is provided on the inside of the first arm 11. In this embodiment, the driving board 831 is attached to a housing (a motor cover) of the motor 401M. Consequently, compared with when the driving board 831, which is a heat source, is provided in the housing space 42 of the base 4, the temperature of the housing space 42 can be reduced. Accordingly, the influence by the heat of the control board 81 can be reduced.

A voltage supplied to the first motor 401M is not particularly limited. However, the voltage supplied to the first motor 401M is desirably 1 V or more and 100 V or less, more desirably 10 V or more and 100 V or less, and still more desirably 50 V or more and 60 V or less. Consequently, the first motor 401M and the power supply board 82 can be reduced in size. Accordingly, a reduction in the size of the robot 1 can be achieved.

As shown in FIG. 1, the driving mechanisms 402 to 406 and the driving boards 832 to 836 (see FIG. 3) are respectively provided on the insides of predetermined arms of the robot arm 10. Consequently, compared with when the driving boards 832 to 836, which are heat sources, are provided in the housing space 42 of the base 4, the temperature of the housing space 42 can be reduced. Accordingly, the influence by the heat of the control board 81 can be reduced. In this embodiment, the second motor 402M and the third motor 403M are provided on the inside of the second arm 12. The fourth motor 404M is provided on the inside of the third arm 13. The fifth motor 405M and the sixth motor 406M are provided on the inside of the fourth arm 14. Note that the second motor 402M to the sixth motor 406M may be respectively disposed in other positions.

Voltages supplied to the motors 402M to 406M are not respectively particularly limited. However, the voltages supplied to the motors 402M to 406M are desirably 1 V or more and 100 V or less, more desirably 10 V or more and 100 V or less, and still more desirably 50 V or more and 60 V or less. Consequently, the motors 402M to 406M and the power supply board 82 can be reduced in size. Accordingly, a reduction in the size of the robot 1 can be achieved.

A cooling device such as a fan is not provided in the base 4. Consequently, the number of components can be reduced. The configuration of the base 4 can be simplified. The base 4 can be reduced in size. Accordingly, a reduction in the size of the robot 1 can be achieved. Note that, in the robot 1, as explained above, because the first driving mechanism 401 and the driving boards 831 to 836 are not provided in the housing space 42, the temperature of the housing space 42 can be reduced. Therefore, no problem occurs even if the cooling device such as the fan is not provided in the base 4.

Note that the first motor 401M (the first driving mechanism 401) may be provided not only in the first arm 11 but also in, for example, the base 4. The driving board 831 may be provided not only in the first arm 11 and but also in, for example, the base 4. A part or all of the driving boards 832 to 836 may be provided not only in the robot arm 10 but also in, for example, the base 4. The cooling device such as the fan may be provided in the base 4.

As shown in FIG. 12, in the wire 91, an excess length longer than a distance L1 (see FIG. 13) between the supporting member 5 in a state in which the supporting member 5 is provided in the base 4 and the supporting member 5 in a state in which the supporting member 5 is removed from the base 4 is provided with respect to a length without play. The excess length of the wire 91 is not particularly limited and is set as appropriate according to conditions. However, the excess length of the wire 91 is desirably 1.2 times or more of the distance L1, more desirably 1.5 times or more of the distance L1, and still more desirably twice or more and three times or less of the distance L1. Consequently, the supporting member 5 can be easily and quickly attached to and detached from the base 4. The state in which the supporting member 5 is removed from the base 4 refers to a state in which, as shown in FIG. 13, the supporting member 5 is located in the position of the lid body 44 attached to the rear end face 431 of the main body section 43 of the base 4.

As shown in FIGS. 10 and 11, in the wires 921 and 922, excess lengths longer than a distance L2 between the first position and the second position (a center-to-center distance between the female screw 513 and the female screw 514 corresponding to the female screw 513) (see FIG. 13) are respectively provided with respect to lengths without play. The excess lengths of the wires 921 and 922 are respectively not particularly limited and are set as appropriate according to conditions. However, the excess lengths of the wires 921 and 922 are desirably 1.2 times or more of the distance L2, more desirably 1.5 times or more of the distance L2, and still more desirably twice or more and three times or less of the distance L2. Consequently, the position of the control board 81 can be easily and quickly changed from one to the other of the first position and the second position. Note that the excess length of the wire 921 and the excess length of the wire 922 may be the same or may be different.

The fifth driving mechanism 405 (the A driving mechanism) configured to drive the fifth arm 15 (the A arm) and the sixth driving mechanism 406 (the B driving mechanism) configured to drive the sixth arm 16 (the B arm) are explained.

First, as shown in FIGS. 14 and 15, the fourth arm 14 includes a main body section 141, a lid body 142 attached to one end side of the main body section 141, and a lid body 143 attached to the other end side of the main body section 141. Note that, in FIG. 14, the fourth arm 14 in a state in which the lid body 143 is detached is shown.

The fifth arm 15 includes a first portion 151 extending from the distal end portion of the fourth arm 14 in the axial direction of the fifth rotation axis O5 and formed in a tubular shape and a second portion 152 extending from the first portion 151 in the axial direction of the sixth rotation axis O6 and formed in a tubular shape. The axial direction (a projecting direction) of the first portion 151 and the axial direction (a projecting direction) of the second portion 152 are different by 90°. A space 153 is formed between the first portion 151 and the second portion 152.

The fifth driving mechanism 405 includes the motor 405M (the A motor), the reduction gear 65 (the A reduction gear), and a transmitting mechanism 705 configured to transmit a driving force of the motor 405M to an input shaft of the reduction gear 65. The transmitting mechanism 705 is provided on the inside of the robot arm 10. The motor 405M is provided on the inside of the fourth arm 14. The reduction gear 65 is provided in the joint 175 that couples the fourth arm 14 and the fifth arm 15.

The transmitting mechanism 705 includes a pulley 725 (a driving pulley), a pulley 735 (a driven pulley), and a belt 715 (a timing belt).

The pulley 725 is coupled (connected) to an output shaft 4051 (a rotating shaft) of the motor 405M. The pulley 735 is coupled to the input shaft of the reduction gear 65. The belt 715 is an endless belt and is laid over the pulley 725 and the pulley 735. A flexible gear 652 (an output shaft) of the reduction gear 65 is coupled to the fifth arm 15. A driving force (rotation) of the motor 405M is transmitted to the reduction gear 65 by the pulleys 725 and 735 and the belt 715. Rotating speed of the motor 405M is reduced by the reduction gear 65 and transmitted to the fifth arm 15.

The sixth driving mechanism 406 includes the motor 406M (the B motor), the reduction gear 66 (the B reduction gear), and a transmitting mechanism 706 configured to transmit a driving force of the motor 406M to an input shaft of the reduction gear 66. The transmitting mechanism 706 is provided on the inside of the robot arm 10. The motor 406M is provided on the inside of the fourth arm 14. The reduction gear 66 is provided in the joint 176 that couples the fifth arm 15 and the sixth arm 16.

The transmitting mechanism 706 includes a pulley 726 (a driving pulley), a pulley 736 (a driven pulley), a belt 716 (a timing belt), and a pair of bevel gears 746 and 756 that mesh with each other. The bevel gear 746 includes a shaft section 7461. The bevel gear 756 includes a shaft section 7561.

The pulley 726 is coupled (connected) to an output shaft 4061 (a rotating shaft) of the motor 406M. The pulley 736 is coupled to the shaft section 7461 of the bevel gear 746. The belt 716 is an endless belt and is laid over the pulley 726 and the pulley 736. The shaft section 7561 of the bevel gear 756 is coupled to the input shaft of the reduction gear 66. A rigid gear 661 (an output shaft) of the reduction gear 66 is coupled to the sixth arm 16. A driving force (rotation) of the motor 406M is transmitted to the bevel gear 746 by the pulleys 726 and 736 and the belt 716. The direction of a rotation axis of the driving force is changed by 90° by the bevel gear 746 and the bevel gear 756. The driving force is transmitted to the reduction gear 66. Rotating speed of the motor 406M is reduced by the reduction gear 66. The driving force is transmitted to the fifth arm 15. Before an output axis of the driving force is changed by the bevel gears 746 and 756, the rotation axis of the driving force corresponds with the fifth rotation axis O5. After the output axis of the driving force is changed by the bevel gears 746 and 756, the rotation axis of the driving force corresponds with the sixth rotation axis O6.

"Correspond" includes not only complete correspondence but also, for example, separation in a degree for enabling a technical effect to be exerted and separation within a range of an error in manufacturing.

Note that, as the bevel gears 746 and 756 included in the transmitting mechanism 706, other mechanisms having the same functions, for example, a worm and a worm wheel may be used.

As the reduction gear 65 and the reduction gear 66, in this embodiment, wave reduction gears are respectively used.

Consequently, a reduction in the size and a reduction in the weight of the reduction gears 65 and 66 can be achieved. Accordingly, a reduction in the size and a reduction in the weight of the robot 1 can be achieved.

Specifically, as shown in FIG. 16, the reduction gear 65 includes a rigid gear 651 (a circular spline in a harmonic drive), which is an internal gear, the flexible gear 652 (a flex spline in the harmonic drive), which is an external gear of a silk hat type, disposed on the inner side of the rigid gear 651, a wave generator 653 disposed on the inner side of the flexible gear 652, and a cross roller bearing 654 provided between the rigid gear 651 and the flexible gear 652. The number of teeth of the rigid gear 651 of the reduction gear 65 is larger than the number of teeth of the flexible gear 652 of the reduction gear 65. The flexible gear 652 partially meshes with the rigid gear 651. The wave generator 653 (a wave generator in the harmonic drive) comes into contact with the inner circumferential surface of the flexible gear 652 and moves a meshing position of the rigid gear 651 and the flexible gear 652 in the circumferential direction.

The rigid gear 651 is screwed (coupled) to the fourth arm 14. The wave generator 653 is screwed to the pulley 735 of the fifth driving mechanism 405 by a plurality of male screws 210. An inner ring 6541 of the cross roller bearing 654 is screwed to the rigid gear 651 by a plurality of male screws 220. An outer ring 6542 of the cross roller bearing 654 is screwed to the flexible gear 652 by a plurality of male screws 230 and is further coupled (fixed) to the fifth arm 15. That is, the flexible gear 652 is fixed to the fifth arm 15 via the outer ring 6542 of the cross roller bearing 654. Note that the wave generator 653 functions as the input shaft of the reduction gear 65. The flexible gear 652 (the outer ring 6542 of the cross roller bearing 654) functions as an output shaft of the reduction gear 65. In the following explanation, the wave generator 653 is the input shaft of the reduction gear 65 and the flexible gear 652 is the output shaft of the reduction gear 65.

When the motor 405M is driven and the pulley 735 rotates, the wave generator 653 rotates at the same rotating speed as rotating speed of the pulley 735. Because the numbers of teeth of the rigid gear 651 and the flexible gear 652 are different from each other, the rigid gear 651 and the flexible gear 652 relatively rotate while the meshing position of the rigid gear 651 and the flexible gear 652 moves in the circumferential direction. That is, because the number of teeth of the rigid gear 651 is larger than the number of teeth of the flexible gear 652, the flexible gear 652 rotates at rotating speed lower than the rotating speed of the pulley 735.

The rigid gear 651 is a gear configured by a rigid body that substantially does not bend in the radial direction and is a ring-like internal gear including inner teeth (teeth). In this embodiment, the rigid gear 651 is a spur gear. Note that the rigid gear 651 is not limited to the spur gear. Examples of the rigid gear 651 include a helical gear and a double helical gear.

The flexible gear 652 is disposed on the inner side of the rigid gear 651 and rotatably provided. The flexible gear 652 is a gear having flexibility deflectively deformable in the radial direction and is an external gear including outer teeth (teeth) that mesh with the inner teeth of the rigid gear 651. The number of teeth of the flexible gear 652 is smaller than the number of teeth of the rigid gear 651. Because the numbers of teeth of the flexible gear 652 and the rigid gear 651 are different from each other, a reduction gear can be realized.

The wave generator 653 is disposed on the inner side of the flexible gear 652 and rotatably provided. The wave generator 653 deforms the shape of the cross section of the flexible gear 652 into, for example, an elliptical shape and meshes the outer teeth of the flexible gear 652 with the inner teeth of the rigid gear 651. In this case, the flexible gear 652 partially meshes with the rigid gear 651.

In this embodiment, the wave generator 653 includes a cam 6531 and a bearing 6532 attached to the outer circumference of the cam 6531.

A plurality of screw holes 6533 (female screws) for attachment are formed in the cam 6531. The wave generator 653 is attached to the pulley 735 by screwing the male screws 210 in the screw holes 6533.

The bearing 6532 and the screw holes 6533 overlap each other when viewed from the axial direction of the wave generator 653 (the input shaft). Consequently, a reduction in the size and a reduction in the weight of the reduction gear 65 can be achieved. Accordingly, a reduction in the size and a reduction in the weight of the robot 1 can be achieved. Note that the bearing 6532 and the screw holes 6533 may not overlap each other.

In this embodiment, the shape of the outer circumferential surface of the cam 6531 is an elliptical shape when viewed from the axial direction of the fifth rotation axis O5. Note that the shape of the cam 6531 is not limited to this.

The inner ring 6541 of the cross roller bearing 654 is fit in (fixed to) the outer circumferential surface of the cam 6531 and is elastically deformed in an elliptical shape along the outer circumferential surface of the cam 6531. According to the elastic deformation, the outer ring 6542 of the cross roller bearing 654 is also elastically deformed in an elliptical shape.

In such a wave generator 653, the cam 6531 rotates, whereby the direction of the cam 6531 changes. According to the change of the direction of the cam 6531, the outer circumferential surface of the outer ring 6542 of the cross roller bearing 654 is also deformed. The wave generator 653 moves the meshing position of the rigid gear 651 and the flexible gear 652 in the circumferential direction.

A through-hole 655 (a first through-hole) extending in the axial direction of the wave generator 653 (the input shaft) of the reduction gear 65 (extending along the fifth rotation axis O5) is formed in the center of such a reduction gear 65. Specifically, through-holes are respectively formed in the centers of the rigid gear 651, the flexible gear 652, and the wave generator 653. The through-hole 655 is formed by these through-holes.

The bevel gear 746 (a part of the transmitting mechanism 706) is inserted into the through-hole 655. In this case, the bevel gear 746 is inserted through the through-hole 655. Consequently, a reduction in the size and a reduction in the weight of the fifth arm 15 and the sixth arm 16 can be achieved. Accordingly, a reduction in the size and a reduction in the weight of the robot 1 can be achieved.

As shown in FIG. 17, like the reduction gear 65, the reduction gear 66 includes the rigid gear 661, which is an internal gear, a flexible gear 662, which is an external gear of a silk hat type, disposed on the inner side of the rigid gear 661, a wave generator 663 disposed on the inner side of the flexible gear 662, and a cross roller bearing 664 disposed between the rigid gear 661 and the flexible gear 662. The number of teeth of the rigid gear 661 of the reduction gear 66 is larger than the number of teeth of the flexible gear 662 of the reduction gear 66. The flexible gear 662 partially meshes with the rigid gear 661. The wave generator 663 comes into contact with the inner circumferential surface of the flexible gear 662 and moves a meshing position of the rigid gear 661 and the flexible gear 662 in the circumferential direction.

The rigid gear 661 is screwed (coupled) to the sixth arm 16. The wave generator 663 is screwed to a shaft section 7561 of the bevel gear 756 by a plurality of male screws 260. An inner ring 6641 of the cross roller bearing 664 is screwed to the rigid gear 661 by a plurality of male screws 270. An outer ring 6642 of the cross roller bearing 664 is screwed to the flexible gear 662 by a plurality of male screws 280 and is further coupled (fixed) to the fifth arm 15. That is, the flexible gear 662 is fixed to the fifth arm 15 via the outer ring 6642 of the cross roller bearing 664. Note that the wave generator 663 functions as the input shaft of the reduction gear 66 and the rigid gear 661 functions as an output shaft of the reduction gear 66. In the following explanation, the wave generator 663 is the input shaft of the reduction gear 66 and the rigid gear 661 is the output shaft of the reduction gear 66.

When the motor 406M is driven and the pulley 736 rotates, the wave generator 663 rotates at the same rotating speed as rotating speed of the pulley 736. Because the numbers of teeth of the rigid gear 661 and the flexible gear 662 are different from each other, the rigid gear 661 and the flexible gear 662 relatively rotate while the meshing position of the rigid gear 661 and the flexible gear 662 moves in the circumferential direction. That is, because the number of teeth of the rigid gear 661 is larger than the number of teeth of the flexible gear 662, the flexible gear 662 rotates at rotating speed lower than the rotating speed of the pulley 736.

The rigid gear 661 is a gear configured by a rigid body that substantially does not bend in the radial direction and is a ring-like internal gear including inner teeth (teeth). In this embodiment, the rigid gear 661 is a spur gear. Note that the rigid gear 661 is not limited to the spur gear. Examples of the rigid gear 661 include a helical gear and a double helical gear.

The flexible gear 662 is disposed on the inner side of the rigid gear 661 and rotatably provided. The flexible gear 662 is a gear having flexibility deflectively deformable in the radial direction and is an external gear including outer teeth (teeth) that mesh with the inner teeth of the rigid gear 661. The number of teeth of the flexible gear 662 is smaller than the number of teeth of the rigid gear 661. Because the numbers of teeth of the flexible gear 662 and the rigid gear 661 are different from each other in this way, a reduction gear can be realized.

The wave generator 663 is disposed on the inner side of the flexible gear 662 and rotatably provided. The wave generator 663 deforms the shape of the cross section of the flexible gear 662 into, for example, an elliptical shape and meshes the outer teeth of the flexible gear 662 with the inner teeth of the rigid gear 661. In this case, the flexible gear 662 partially meshes with the rigid gear 661.

In this embodiment, the wave generator 663 includes a cam 6631 and a bearing 6632 attached to the outer circumference of the cam 6631.

In this case, a position of the wave generator 663 with respect to the flexible gear 662 of the reduction gear 66 and a position of the wave generator 653 with respect to the flexible gear 652 of the reduction gear 65 are different from each other. More specifically, a positional relation between the cam 6631 and the bearing 6632 of the wave generator 663 is opposite to a positional relation between the cam 6531 and the bearing 6532 of the wave generator 653 of the reduction gear 65. That is, the cam 6631 of the wave generator 663 is attached in a direction opposite to the direction of the cam 6531 of the wave generator 653. Consequently, the reduction gear 65 and the reduction gear 66 can be assembled from the same component. Accordingly, the number of components can be reduced.

In the cam 6631, a plurality of screw holes 6633 (female screws) for attachment are formed. The wave generator 663 is attached to the shaft section 7561 of the bevel gear 756 by screwing the male screws 260 in the screw holes 6633.

The bearing 6632 and the screw holes 6633 overlap each other when viewed from the axial direction of the wave generator 663 (the input shaft). Consequently, a reduction in the size and a reduction in the weight of the reduction gear 66 can be achieved. Accordingly, a reduction in the size and a reduction in the weight of the robot 1 can be achieved. Note that the bearing 6632 and the screw holes 6633 may not overlap each other.

In this embodiment, the shape of the outer circumferential surface of the cam 6631 is an elliptical shape when viewed from the axial direction of the sixth rotation axis O6. Note that the shape of the cam 6631 is not limited to this.

The inner ring 6641 of the cross roller bearing 664 is fit in (fixed to) the outer circumferential surface of the cam 6631 and is elastically deformed in an elliptical shape along the outer circumferential surface of the cam 6631. According to the elastic deformation, the outer ring 6642 of the cross roller bearing 664 is also elastically deformed in an elliptical shape.

In such a wave generator 663, the cam 6631 rotates, whereby the direction of the cam 6631 changes. According to the change of the direction of the cam 6631, the outer circumferential surface of the outer ring 6642 of the cross roller bearing 664 is also deformed. The wave generator 663 moves the meshing position of the rigid gear 661 and the flexible gear 662 in the circumferential direction.

A through-hole 665 (a second through-hole) extending in the axial direction of the flexible gear 662 (the input shaft) of the sixth reduction gear 66 (extending along the sixth rotation axis O6) is formed in the center of such a reduction gear 66. Specifically, through-holes are respectively formed in the centers of the rigid gear 661, the flexible gear 662, and the wave generator 663. The through-hole 665 is formed by these through-holes.

A through-hole 7562 (a fourth through-hole) extending in the axial direction of the wave generator 663 (the input shaft) of the sixth reduction gear 66 (extending along the sixth rotation axis O6) is formed in the center of the bevel gear 756. Consequently, a reduction in the weight of the bevel gear 756 can be achieved.

A cylinder body 32 (a second cylinder body) is set (disposed) in the through-hole 7562 (the through-hole 665). The cylinder body 32 is disposed from the proximal end face of the second portion 152 of the fifth arm 15 to the distal end face of the sixth arm 16. The cylinder body 32 is coupled (fixed) to the fifth arm 15 by, for example, bonding.

Consequently, as shown in FIG. 15, a long body such as a cable 310 (a wire) can be inserted through the cylinder body 32 (the through-hole 665). By providing the cylinder body 32, when the sixth arm 16 turns, the cable 310 can be prevented from rubbing against the sixth arm 16.

Note that the through-hole 7562 of the bevel gear 756 and the cylinder body 32 may be respectively omitted.

In this robot 1, a center axis 656 of the wave generator 653 (the input shaft) and a center axis 657 of the flexible gear 652 (the output shaft) of the reduction gear 65 correspond to each other. A center axis 666 of the wave generator 663 (the input shaft) and a center axis 667 of the rigid gear 661 (the input shaft) of the reduction gear 66 correspond to each other. The axial direction of the wave generator 653 (the input shaft) of the reduction gear 65 and the axial direction of the wave generator 663 (the input shaft) of the reduction gear 66 are different from each other. In this embodiment, the center axis 656 of the wave generator 653 (the input shaft) of the reduction gear 65 and the center axis 666 of the wave generator 663 (the input shaft) of the reduction gear 66 are orthogonal. Consequently, a reduction in the size and a reduction in the weight of the fifth arm 15 and the sixth arm 16 can be achieved. Accordingly, a reduction in the size and a reduction in the weight of the robot 1 can be achieved.

A rotation axis 7463 of the bevel gear 746 and the center axis 656 of the wave generator 653 (the input shaft) of the reduction gear 65 correspond to each other. A rotation axis 7563 of the bevel gear 756 and the center axis 666 of the wave generator 663 (the input shaft) of the reduction gear 66 correspond to each other. Consequently, a reduction in the size and a reduction in the weight of the reduction gears 65 and 66 can be achieved. Accordingly, a reduction in the size and a reduction in the weight of the robot 1 can be achieved.

As explained above, with the robot 1, a reduction in size and a reduction weight can be achieved.

As explained above, the robot 1 includes the robot arm 10 including the fifth arm 15 (the A arm) rotatable around the fifth rotation axis O5 (the A rotation axis) and the sixth arm 16 (the B arm) provided in the fifth arm 15 (the A arm) rotatably around the sixth rotation axis O6 (the B rotation axis) having the axial direction different from the axial direction of the fifth rotation axis O5 (the A rotation axis), the fifth driving mechanism 405 (the A driving mechanism) including the fifth motor 405M (the A motor) and the fifth reduction gear 65 (the A reduction gear) and configured to drive the fifth arm 15 (the A arm), and the sixth driving mechanism 406 (the B driving mechanism) including the sixth motor 406M (the B motor) and the sixth reduction gear 66 (the B reduction gear) and configured to drive the sixth arm 16 (the B arm).

The center axis 656 of the wave generator 653 (the input shaft) and the center axis 657 of the flexible gear 652 (the output shaft) of the fifth reduction gear 65 (the A reduction gear) correspond to each other. The center axis 666 of the wave generator 663 (the input shaft) and the center axis 667 of the rigid gear 661 (the output shaft) of the sixth reduction gear 66 (the B reduction gear) correspond to each other. The axial direction of the wave generator 653 (the input shaft) of the fifth reduction gear (the A reduction gear) and the axial direction of the wave generator 663 (the input shaft) of the sixth reduction gear 66 (the B reduction gear) are different from each other.

The fifth reduction gear 65 (the A reduction gear) includes the through-hole 655 (the first through-hole) extending in the axial direction of the wave generator 653 (the input shaft) of the fifth reduction gear 65 (the A reduction gear). The sixth driving mechanism 406 (the B driving mechanism) includes the transmitting mechanism 706 configured to transmit a driving force of the sixth motor 406M (the B motor) to the wave generator 663 (the input shaft) of the sixth reduction gear 66 (the B reduction gear). A part of the transmitting mechanism 706 is inserted through the through-hole 655 (the first through-hole).

With such a robot 1, a reduction in the size and a reduction in the weight of the robot 1 can be achieved.

The sixth reduction gear 66 (the B reduction gear) includes the through-hole 665 (the second through-hole) extending in the axial direction of the wave generator 663 (the input shaft) of the sixth reduction gear 66 (the B reduction gear). Consequently, for example, a wire can be inserted through the through-hole 665 (the second through-hole). A reduction in the weight of the sixth reduction gear 66 (the B reduction gear) can be achieved.

The fifth reduction gear 65 (the A reduction gear) and the sixth reduction gear 66 (the B reduction gear) are respectively the wave reduction gears. Consequently, a reduction in the size and a reduction in the weight of the robot 1 can be achieved.

The wave reduction gear includes the rigid gear 651 (the internal gear), the flexible reduction gear 652 (the external gear) configured to partially mesh with the rigid gear 651 (the internal gear), and the wave generator 653 configured to come into contact with the inner circumferential surface of the flexible gear 652 (the external gear) and move the meshing position of the rigid gear 651 (the internal gear) and the flexible gear 652 (the external gear) in the circumferential direction. Consequently, a reduction in the size and a reduction in the weight of the robot 1 can be achieved.

The wave generator 653 of the fifth reduction gear 65 (the A reduction gear) includes the bearing 6532 and the screw holes 6533. The bearing 6532 of the fifth reduction gear 65 (the A reduction gear) and the screw holes 6533 of the fifth reduction gear 65 (the A reduction gear) overlap each other when viewed from the axial direction of the wave generator 653 (the input shaft) of the fifth reduction gear 65 (the A reduction gear). Consequently, a reduction in the size and a reduction in the weight of the robot 1 can be achieved.

The wave generator 663 of the sixth reduction gear 66 (the B reduction gear) includes the bearing 6632 and the screw holes 6633. The bearing 6632 of the sixth reduction gear 66 (the B reduction gear) and the screw holes 6633 of the sixth reduction gear 66 (the B reduction gear) overlap each other when viewed from the axial direction of the wave generator 663 (the input shaft) of the sixth reduction gear (the B reduction gear). Consequently, a reduction in the size and a reduction in the weight of the robot 1 can be achieved.

The position of the wave generator 653 of the fifth reduction gear 65 (the A reduction gear) with respect to the rigid gear 651 (the internal gear) of the fifth reduction gear 65 (the A reduction gear) and the position of the wave generator 663 of the sixth reduction gear 66 (the B reduction gear) with respect to the rigid gear 661 (the internal gear) of the sixth reduction gear 66 (the B reduction gear) are different from each other. Consequently, the same components can be used in the fifth reduction gear 65 (the A reduction gear) and the sixth reduction gear 66 (the B reduction gear). Consequently, the number of components can be reduced.

The rigid gear 651 (the internal gear) of the fifth reduction gear 65 (the A reduction gear) and the rigid gear 661 (the internal gear) of the sixth reduction gear 66 (the B reduction gear) are respectively fixed to the fifth arm 15 (the A arm). Consequently, the fifth reduction gear 65 (the A reduction gear) and the sixth reduction gear 66 (the B reduction gear) can be appropriately attached.

The transmitting mechanism 706 includes the bevel gear 746 (the first bevel gear) and the bevel gear 756 (the second bevel gear) that mesh with each other. The rotation axis 7463 of the bevel gear 746 (the first bevel gear) and the center axis 656 of the wave generator 653 (the input shaft) of the fifth reduction gear 65 (the A reduction gear) correspond to each other. The rotation axis 7563 of the bevel gear 756 (the second bevel gear) and the center axis 666 of the wave generator 663 (the input shaft) of the sixth reduction gear 66 (the B reduction gear) correspond to each other. Consequently, a reduction in the size and a reduction in the weight of the robot 1 can be achieved.

The bevel gear 756 (the second bevel gear) includes the through-hole 7562 (the fourth through-hole) extending in the axial direction of the wave generator 663 (the input shaft) of the sixth reduction gear 66 (the B reduction gear). Consequently, for example, a wire can be inserted through the through-hole 7562 (the fourth through-hole). A reduction in the weight of the bevel gear 756 (the second bevel gear) can be achieved.

The sixth arm 16 (the B arm) is the arm on the most distal end side of the robot arm 10. Consequently, a reduction in the size and a reduction in weight of the distal end portion of the robot arm 10 can be achieved.

The robot arm 10 includes the rotatable fourth arm 14 (the C arm). The fifth arm 15 (the A arm) is rotatably cantilevered by the fourth arm 14 (the C arm). Consequently, a reduction in the size and a reduction in the weight of the robot 1 can be achieved.

Second Embodiment

Figure 18:
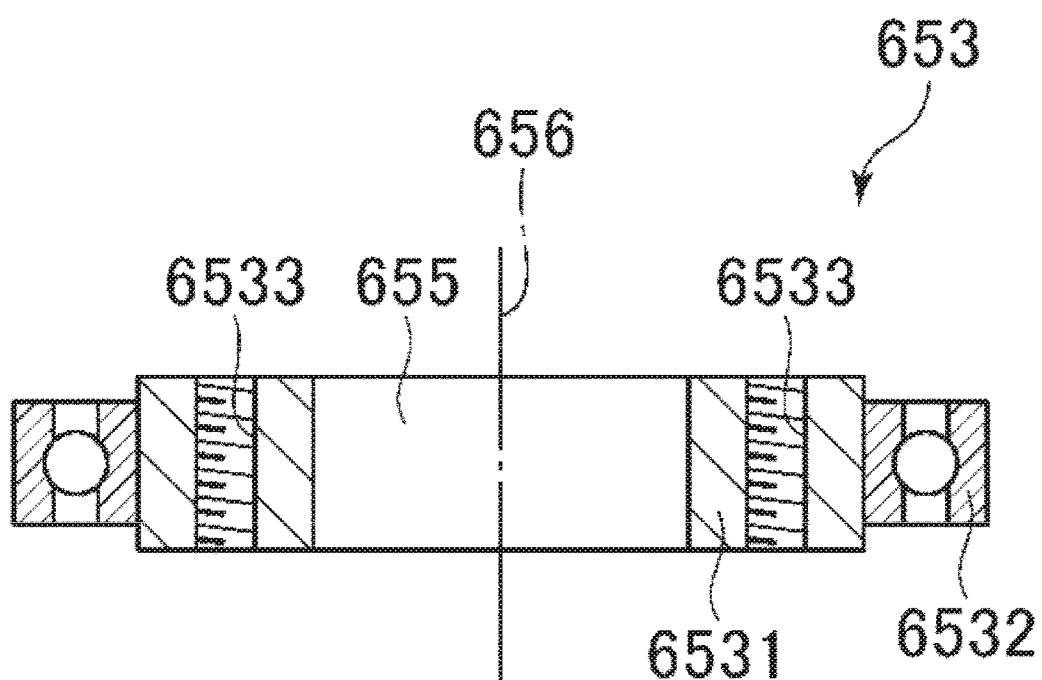
FIG. 18 is a sectional view showing a wave generator of a fifth reduction gear (an A reduction gear) in a robot according to a second embodiment of the invention.

FIG. 18 is a sectional view showing a wave generator of a fifth reduction gear (an A reduction gear) in a robot according to a second embodiment of the invention.

The second embodiment is explained below. Differences from the first embodiment are mainly explained. Explanation of similarities to the first embodiment is omitted.

As shown in FIG. 18, in the second embodiment, in the reduction gear 65, the bearing 6532 and the screw holes 6533 do not overlap each other (are separated from each other) when viewed from the axial direction (the direction of the center axis 656) of the wave generator 653 (the input shaft). The wave generator 653 is vertically symmetrically formed in FIG. 18. The screw holes 6533 are through-holes. Consequently, the wave generator 653 can be attached in the same manner in both of the upper and lower parts in FIG. 18. The wave generator 663 of the reduction gear 66 is configured the same as the wave generator 653.

Note that one of the wave generators 653 and 663 may be configured the same as the wave generator in the first embodiment.

According to the second embodiment explained above, the same effects as the effects in the first embodiment can be exerted.

Third Embodiment

Figure 19:
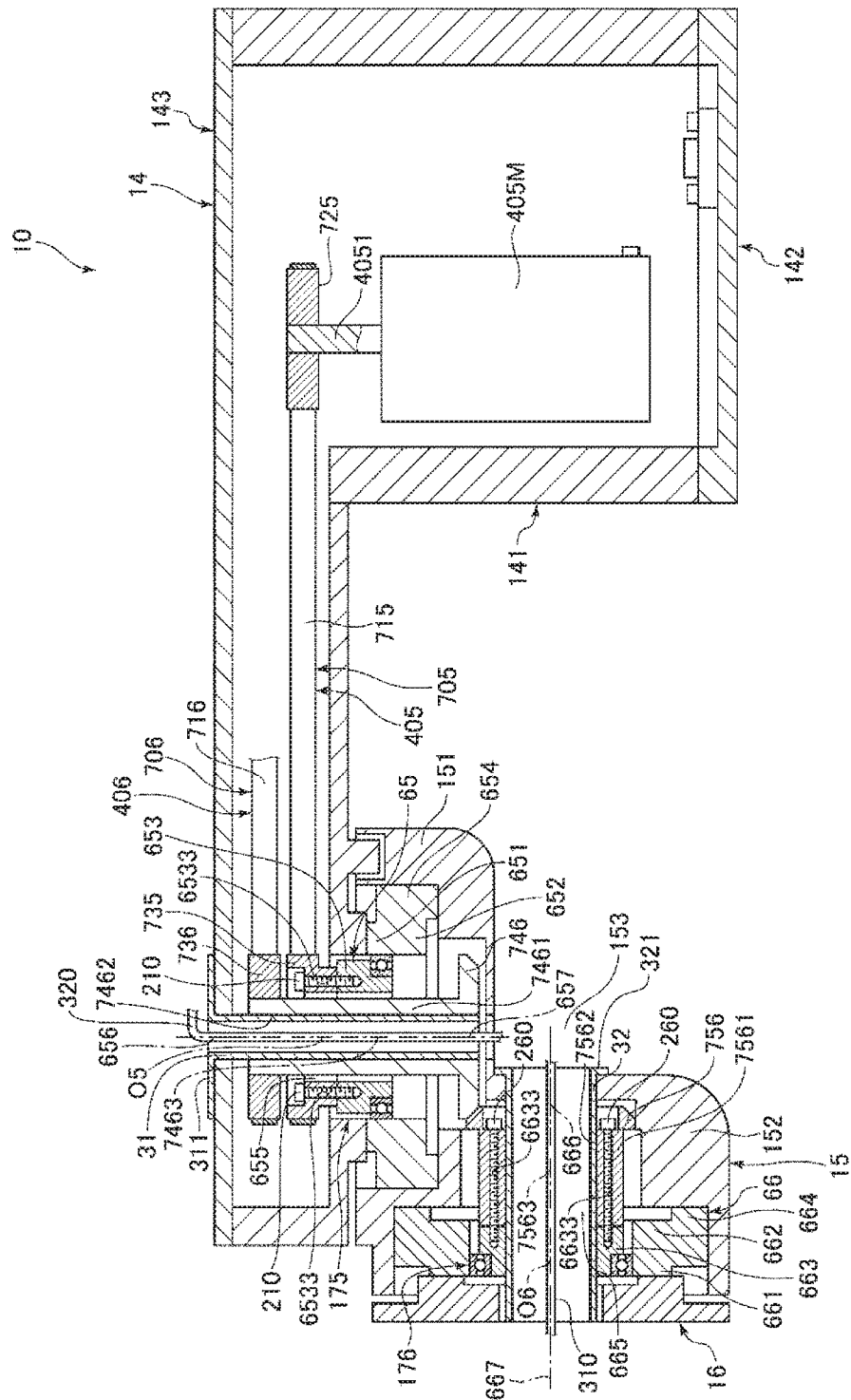
FIG. 19 is a sectional view (a sectional view corresponding to FIG. 15) showing a fourth arm, a fifth arm, a sixth arm, a fifth driving mechanism, and a sixth driving mechanism in a robot according to a third embodiment of the invention.

FIG. 19 is a sectional view (a sectional view corresponding to FIG. 15) showing a fourth arm, a fifth arm, a sixth arm, a fifth driving mechanism, and a sixth driving mechanism of a robot according to a third embodiment of the invention.

The third embodiment is explained below. However, differences from the embodiments explained above are mainly explained. Explanation of similarities to the embodiments explained above is omitted.

As shown in FIG. 19, in the third embodiment, a through-hole 7462 (a third through-hole) extending in the axial direction of the wave generator 653 (the input shaft) of the fifth reduction gear 65 (extending along the fifth rotation axis O5) is formed in the center of the bevel gear 746. Consequently, a reduction in the size of the bevel gear 746 can be achieved.

A cylinder body 31 (a first cylinder body) is set (disposed) in the through-hole 7462 (the through-hole 655). The cylinder body 31 includes a flange 311. The cylinder body 31 is disposed from the upper surface in FIG. 19 of the fourth arm 14 to the end face (the proximal end face) on the head side of the bevel gear 746. In the cylinder body 31, the flange 311 is coupled (fixed) to the fourth arm 14 by, for example, bonding. Consequently, a long body such as a cable 320 (a wire) can be inserted through the cylinder body 31 (the through-hole 655). By providing the cylinder body 31, when the fifth arm 15 turns, the cable 320 can be prevented from rubbing against the fifth arm 15. Note that the cylinder body 31 may be omitted.

The through-hole 7562 (the fourth through-hole) extending in the axial direction of the wave generator 663 (the input shaft) of the sixth reduction gear 66 (extending along the sixth rotation axis O6) is formed in the center of the bevel gear 756. Consequently, a reduction in the weight of the bevel gear 756 can be achieved.

The cylinder body 32 (the second cylinder body) is set (disposed) in the through-hole 7562 (the through-hole 665). The cylinder body 32 includes a flange 321. The cylinder body 32 is disposed from the proximal end face of the second portion 152 of the fifth arm 15 to the distal end face of the sixth arm 16. In the cylinder body 32, the flange 321 is coupled (fixed) to the second portion 152 of the fifth arm 15 by, for example, bonding. Consequently, a long body such as the cable 310 (the wire) can be inserted through the cylinder body 32 (the through-hole 665). By providing the cylinder body 32, when the sixth arm 16 turns, the cable 310 can be prevented from rubbing against the sixth arm 16. Note that the cylinder body 31 may be omitted.

According to the third embodiment explained above, the same effects as the effects of the embodiments explained above can be exerted.

As explained above, the bevel gear 746 (the first bevel gear) includes the through-hole 7462 (the third through-hole) extending in the axial direction of the wave generator 653 (the input shaft) of the fifth reduction gear 65 (the A reduction gear). Consequently, for example, a wire can be inserted through the through-hole 7462 (the third through-hole). A reduction in the weight of the bevel gear 746 (the first bevel gear) can be achieved.

The robot 1 includes the cylinder body 31 (the first cylinder body) fixed to the fourth arm 14 (the C arm) and disposed in the through-hole 655 (the first through-hole). Consequently, for example, a wire can be inserted through the cylinder body 31 (the first cylinder body). When the fifth arm (the A arm) turns, the wire can be prevented from rubbing against the fifth arm 15 (the A arm).

The robot 1 includes the cylinder body 32 (the second cylinder body) fixed to the fifth arm 15 (the A arm) and disposed in the through-hole 665 (the second through-hole). Consequently, for example, a wire can be inserted through the cylinder body 32 (the second cylinder body). When the sixth arm 16 (the B arm) turns, the wire can be prevented from rubbing against the sixth arm 16 (the B arm).

Fourth Embodiment

Figure 20:
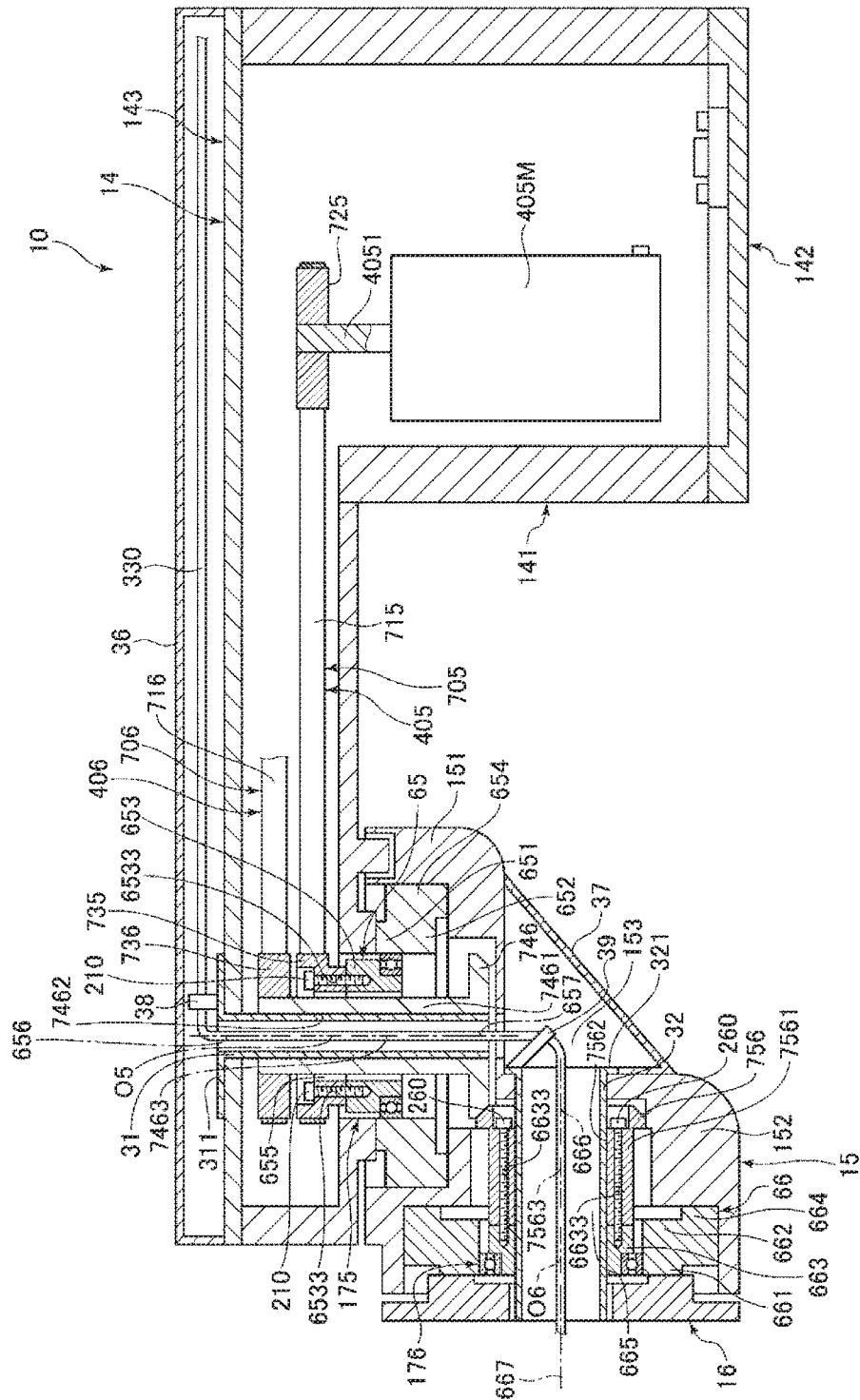
FIG. 20 is a sectional view (a sectional view corresponding to FIG. 15) showing a fourth arm, a fifth arm, a sixth arm, a fifth driving mechanism, and a sixth driving mechanism in a robot according to a fourth embodiment of the invention.
Figure 21:
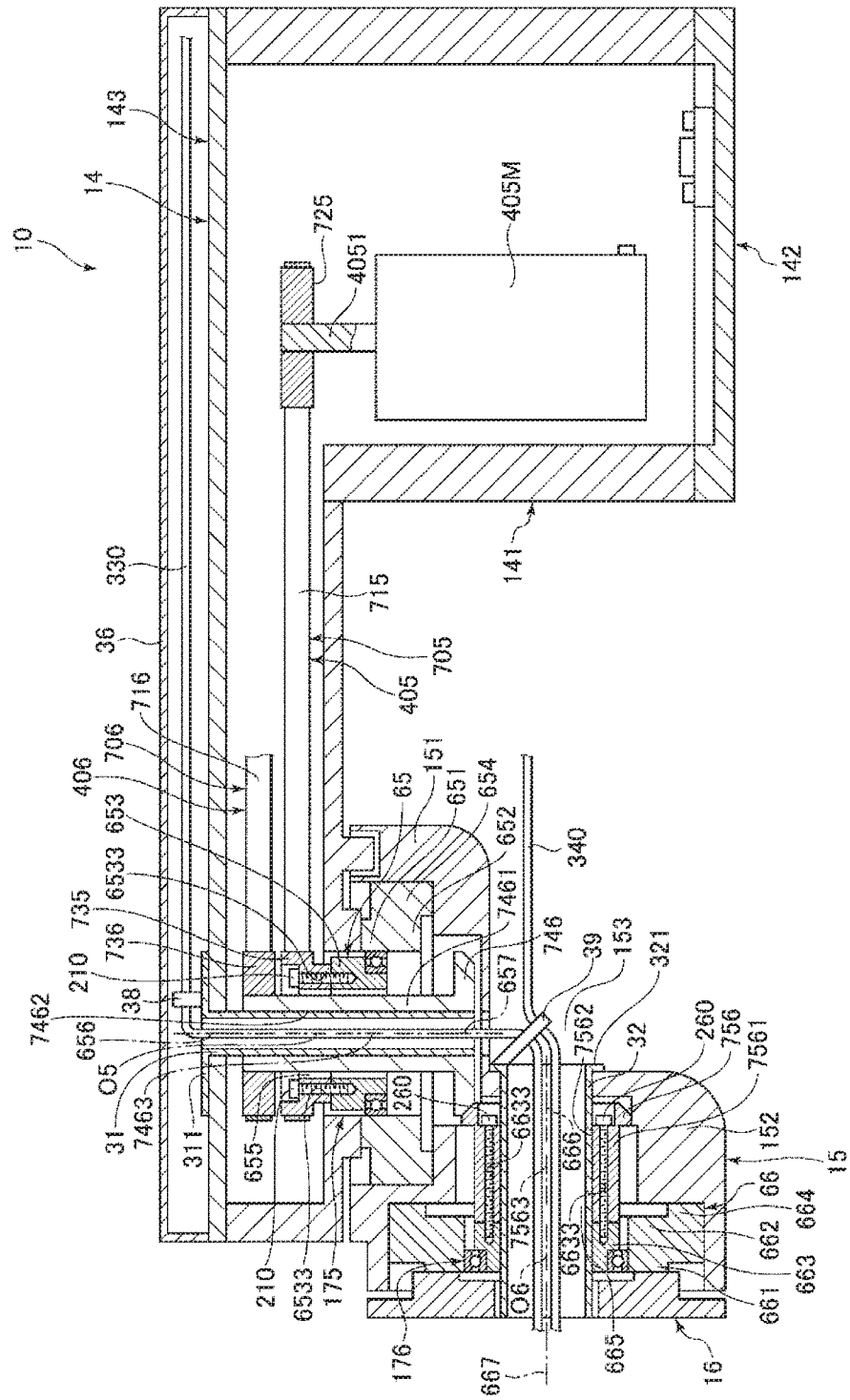
FIG. 21 is a sectional view (a sectional view corresponding to FIG. 15) showing the fourth arm, the fifth arm, the sixth arm, the fifth driving mechanism, and the sixth driving mechanism in the robot according to the fourth embodiment of the invention.

FIGS. 20 and 21 are respectively sectional views (sectional views corresponding to FIG. 15) showing a fourth arm, a fifth arm, a sixth arm, a fifth driving mechanism, and a sixth driving mechanism of a robot according to a fourth embodiment of the invention.

The fourth embodiment is explained below. However, differences from the embodiments explained above are mainly explained. Explanation of similarities to the embodiments explained above is omitted.

As shown in FIG. 20, in the fourth embodiment, the robot 1 includes a cover 36, which is an example of a first position restriction configured to restrict the position of a long body such as a cable 330 (a wire). The cover 36 is detachably attached to (provided in) the lid body 143 of the fourth arm 14. The cover 36 covers at least a part of a surface (in this embodiment, the entire surface) on the upper side in FIG. 20 of the lid body 143. The cable 330 is disposed in the cover 36 (a space between the cover 36 and the fourth arm 14).

In the cover 36, a holding section 38 (a third position restriction) configured to detachably hold (support) the cable 330 and restrict the position of the cable 330 is provided. The holding section 38 is disposed near the cylinder body 31. Note that the holding section 38 may be provided in the cover 36 or may be provided in the fourth arm 14. The holding section 38 is not particularly limited. Examples of the holding section 38 include a holding section including a hook capable of hooking the cable 330. The holding section 38 may be configured to be capable of holding one cable 330 or may be configured to be capable of holding a plurality of cables 330.

The robot 1 includes a cover 37, which is an example of a second position restriction configured to restrict the position of the cable 330. The cover 37 is detachably attached to (provided in) the fifth arm 15 and disposed between the first portion 151 and the second portion 152. The cover 37 covers at least a part of the distal end face (in this embodiment, the entire distal end face) of the first portion 151 and at least a part of the proximal end face (in this embodiment, the entire proximal end face) of the second portion 152. The cable 330 is disposed in the cover 37 (a space between the cover 37 and the fifth arm 15).

In the cover 37, a holding section 39 (a fourth position restriction) configured to detachably hold (support) the cable 330 and restrict the position of the cable 330 is provided. The holding section 39 is disposed near the cylinder bodies 31 and 32. Note that the holding section 39 may be provided in the cover 37 or may be provided in the fifth arm 15. The holding section 39 is not particularly limited. Examples of the holding section 39 include a holding section including a hook capable of hooking the cable 330. The holding section 39 may be configured to be capable of holding one cable 330 or may be configured to be capable of holding a plurality of cables 330.

The cable 330 is inserted through the cylinder body 31, once drawn out from the inside to the outside of the fifth arm 15, inserted through the cylinder body 32, and, when being inserted through the cylinder body 32, drawn into the inside of the fifth arm 15 again.

When the holding section 39 is configured to be capable of holding a plurality of cables and, for example, a cable 340 is added besides the cable 330 as shown in FIG. 21, the cable 340 can be added by detaching the cover 37. The position of the cable 340 can be restricted by the holding section 39.

In this robot 1, by providing the covers 36 and 37, it is possible to restrict the position of the cable 330 (or the cables 330 and 340) and prevent the cable 330 from interfering with a peripheral device and the like.

By providing the holding sections 38 and 39, the cable 330 is disposed on or near the fifth rotation axis O5 or on or near the sixth rotation axis O6. Therefore, it is possible to easily perform management and the like of an excess length of the cable 330.

When a cable is insufficient, another cable can be easily and quickly added.

According to the fourth embodiment explained above, the same effects as the effects of the embodiments explained above can be exerted.

Note that one of the cover 36 and the cover 37 may be omitted. One or both of the holding section 38 and the holding section 39 may be omitted.

The fifth arm 15 may be double-supported (a both-side supporting structure) rather than being cantilevered. In this case, for example, one side of the fifth arm 15 can be used for a driving mechanism and the other side of the fifth arm 15 can be used for a wire.

As explained above, the robot 1 includes the cover 36 (the first position restriction) provided in the fourth arm 14 (the C arm) and configured to restrict the position of the cable 330 (the wire). Consequently, the cable 330 (the wire) can be prevented from interfering with a peripheral device and the like.

The robot 1 includes the cover 37 (the second position restriction) provided in the fifth arm 15 (the A arm) and configured to restrict the position of the cable 330 (the wire). Consequently, the cable 330 (the wire) can be prevented from interfering with a peripheral device and the like.

Fifth Embodiment

Figure 22:
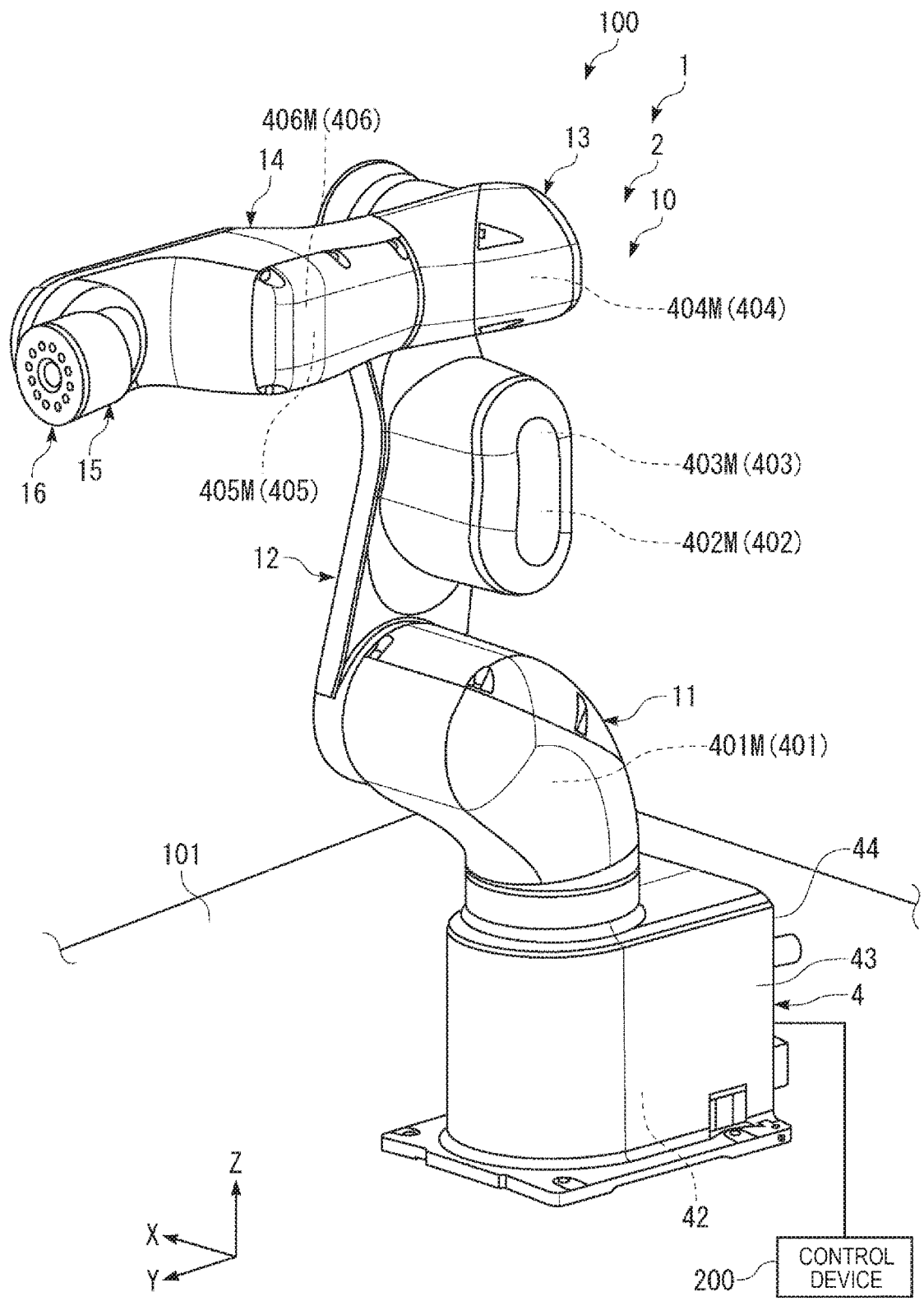
FIG. 22 is a perspective view (including a block diagram) showing a fifth embodiment (a robot system).

FIG. 22 is a perspective view (including a block diagram) showing a fifth embodiment (a robot system).

The fifth embodiment is explained below. However, differences from the embodiments explained above are mainly explained. Explanation of similarities to the embodiments explained above is omitted.

As shown in FIG. 22, in the fifth embodiment, a robot system 100 includes the robot 1 and a control device 200 configured to control driving of the robot 1.

In the robot 1, the supporting member 5, the control board 81, and the power supply board 82 are omitted. The control device 200 has the functions of the control board 81 and the power supply board 82. In other words, the control device 200 can be considered to include the control board 81 and the power supply board 82.

A communication system between the robot 1 and the control device 200 may be a wired system including a cable or the like or may be a wireless system.

According to the fifth embodiment explained above, the same effects as the effects in the embodiments explained above can be exerted.

Note that the robot 1 may include the supporting member 5, the control board 81, and the power supply board 82. That is, the robot system 100 may include the robot 1 including the supporting member 5, the control board 81, and the power supply board 82 and the control device 200.

As explained above, the robot system 100 includes the robot 1 and the control device 200 configured to control driving of the robot 1.

With the robot system 100, a reduction in the size and a reduction in the weight of the robot 1 can be achieved.

The embodiments are explained above with reference to the drawings. However, the invention is not limited to the embodiments. The components of the sections can be replaced with any components having the same functions. Any other components may be added.

In the invention, any two or more configurations (characteristics) in the embodiments may be combined.

In the first embodiment, the control board and the power supply board (the control device) are disposed in the housing space of the base. However, in the invention, the control board and the power supply board are not limited to this. The control board and the power supply board may be respectively disposed in positions other than the base. The robot and a part or the entire control board may be separate bodies. The robot and a part or the entire power supply board may be separate bodies. The robot and a part or the entire control board and a part or the entire power supply board (control device) may be separate bodies. A communication system between the robot and the control device may be a wired system including a cable or the like or may be a wireless system.

In the embodiments, the fixing part of the base of the robot is, for example, the floor in the setting space. However, in the invention, the fixing part of the base of the robot is not limited to this. Examples of the fixing part include, besides the floor, a ceiling, a wall, a workbench, and the ground. The base itself may be movable.

In the invention, the robot may be set in a cell. In this case, examples of the fixing part of the base of the robot include a floor section, a ceiling section, a wall section, and a workbench of the cell.

In the embodiments, the first surface, which is the plane (the surface) to which the robot (the base) is fixed, is the plane (the surface) parallel to the horizontal plane. However, in the invention, the first surface is not limited to this. The first surface may be, for example, a plane (a surface) inclined with respect to the horizontal plane or the vertical plane or may be a plane (a surface) parallel to the vertical plane. That is, the first rotation axis may be inclined with respect to the vertical direction or the horizontal direction, may be parallel to the horizontal direction, or may be parallel to the vertical direction.

In the embodiments, the number of the rotation axes of the robot arm is six. However, in the invention, the number of the rotation axes of the robot arm is not limited to this. The number of the rotation axes of the robot arm may be, for example, two, three, four, five, or seven or more. In the embodiments, the number of the arms (the links) is six. However, in the invention, the number of the arms (the links) is not limited to this. The number of the arms (the links) may be, for example, two, three, four, five, or seven or more. In this case, for example, in the robot in the embodiments, by adding an arm between the second arm and the third arm, a robot including seven arms can be realized.

In the embodiments, the number of the robot arms is one. However, in the invention, the number of the robot arms is not limited to this. The number of the robot arms may be, for example, two or more. That is, the robot (the robot body) may be a plural arm robot such as a double arm robot.

In the invention, the robot may be a robot of another form. Specific examples of the robot include a leg-type walking (running) robot including leg sections and a horizontal articulated robot such as a SCARA robot.

The entire disclosure of Japanese Patent Application No. 2017-212510, filed Nov. 2, 2017, is expressly incorporated by reference herein.

What is claimed is:

1. A robot comprising:
a robot arm including an A arm rotating around an A rotation axis and a B arm provided in the A arm rotatably around a B rotation axis having an axial direction orthogonal to an axial direction of the A rotation axis;
an A driving mechanism including an A motor and an A reduction gear and configured to drive the A arm; and
a B driving mechanism including a B motor and a B reduction gear and configured to drive the B arm, wherein
a center axis of an input shaft and a center axis of an output shaft of the A reduction gear correspond to each other, the center axis of the input shaft of the A reduction gear and the center axis of the output shaft of the A reduction gear corresponding to the A rotation axis,
a center axis of an input shaft and a center axis of an output shaft of the B reduction gear correspond to each other, the center axis of the input shaft of the B reduction gear and the center axis of the output shaft of the B reduction gear corresponding to the B rotation axis,
an axial direction of the input shaft of the A reduction gear and an axial direction of the input shaft of the B reduction gear are different from each other,
the A reduction gear includes a first through-hole extending in the axial direction of the input shaft of the A reduction gear,
the A driving mechanism includes an A transmitting mechanism configured to transmit a driving force of the A motor to the input shaft of the A reduction gear,
the B driving mechanism includes a B transmitting mechanism configured to transmit a driving force of the B motor to the input shaft of the B reduction gear,
the A transmitting mechanism includes a driven pulley and the B transmitting mechanism includes a driven pulley and a bevel gear, and
a shaft of the bevel gear of the B transmitting mechanism is inserted through a through hole in the driven pulley of the A transmitting mechanism and the entire first through-hole.

2. The robot according to claim 1, wherein the B reduction gear includes a second through-hole extending in the axial direction of the input shaft of the B reduction gear.

3. The robot according to claim 1, wherein the A reduction gear and the B reduction gear are wave reduction gears.

4. The robot according to claim 3, wherein
the wave reduction gear includes:
an internal gear;
a flexible external gear configured to partially mesh with the internal gear; and
a wave generator configured to come into contact with an inner circumferential surface of the external gear and move a meshing position of the internal gear and the external gear in the circumferential direction.

5. The robot according to claim 4, wherein
the wave generator of the A reduction gear includes a bearing and a screw hole, and
the bearing of the A reduction gear and the screw hole of the A reduction gear overlap each other when viewed from the axial direction of the input shaft of the A reduction gear.

6. The robot according to claim 4, wherein
the wave generator of the B reduction gear includes a bearing and a screw hole, and
the bearing of the B reduction gear and the screw hole of the B reduction gear overlap each other when viewed from the axial direction of the input shaft of the B reduction gear.

7. The robot according to claim 4, wherein a position of the wave generator of the A reduction gear with respect to the internal gear of the A reduction gear and a position of the wave generator of the B reduction gear with respect to the internal gear of the B reduction gear are different from each other.

8. The robot according to claim 4, wherein the internal gear of the A reduction gear and the internal gear of the B reduction gear are fixed to the A arm.

9. The robot according to claim 1, wherein
the bevel gear of the B transmitting mechanism includes a first bevel gear and a second bevel gear configured to mesh with each other,
a rotation axis of the first bevel gear and the center axis of the input shaft of the A reduction gear correspond to each other, and
a rotation axis of the second bevel gear and the center axis of the input shaft of the B reduction gear correspond to each other.

10. The robot according to claim 9, wherein the first bevel gear includes a third through-hole extending in the axial direction of the input shaft of the A reduction gear.

11. The robot according to claim 9, wherein the second bevel gear includes a fourth through-hole extending in the axial direction of the input shaft of the B reduction gear.

12. The robot according to claim 1, wherein the B arm is an arm on a most distal end side of the robot arm.

13. The robot according to claim 1, wherein
the robot arm includes a C arm rotating around a C rotation axis, and
the A arm is rotatably cantilevered by the C arm.

14. The robot according to claim 13, further comprising a first cylinder body fixed to the C arm and disposed in the first through-hole.

15. The robot according to claim 13, further comprising a first position restriction provided in the C arm and configured to restrict a position of a wire.

16. The robot according to claim 15, further comprising a second position restriction provided in the A arm and configured to restrict a position of a wire.

17. The robot according to claim 13, further comprising a second cylinder body fixed to the A arm and disposed in the second through-hole.

18. The robot according to claim 1, further comprising a second position restriction provided in the A arm and configured to restrict a position of a wire.

* * * * *